(12) United States Patent
Kurashige

(10) Patent No.: US 11,131,964 B2
(45) Date of Patent: Sep. 28, 2021

(54) ILLUMINATION DEVICE

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/477,938

(22) PCT Filed: Jan. 12, 2018

(86) PCT No.: PCT/JP2018/000598
§ 371 (c)(1),
(2) Date: Jul. 15, 2019

(87) PCT Pub. No.: WO2018/135396
PCT Pub. Date: Jul. 26, 2018

(65) Prior Publication Data
US 2019/0361395 A1    Nov. 28, 2019

(30) Foreign Application Priority Data

Jan. 17, 2017   (JP) .......................... JP2017-0055926

(51) Int. Cl.
*G03H 1/22* (2006.01)
*F21V 14/02* (2006.01)
(Continued)

(52) U.S. Cl.
CPC ............ *G03H 1/2202* (2013.01); *F21V 5/04* (2013.01); *F21V 14/02* (2013.01); *F21V 14/06* (2013.01);
(Continued)

(58) Field of Classification Search
CPC ....... B60Q 2400/50; F21V 5/04; F21V 14/02; F21V 14/06; G02B 5/32
See application file for complete search history.

(56) References Cited

U.S. PATENT DOCUMENTS

| 5,798,864 A | 8/1998 | Sekiguchi |
| 2012/0106178 A1 | 5/2012 | Takahashi et al. |
| 2017/0334341 A1* | 11/2017 | Kurashige ............ G03H 1/2286 |

FOREIGN PATENT DOCUMENTS

| EP | 2 128 521 A1 | 12/2009 |
| JP | 2010-061848 A1 | 3/2010 |

(Continued)

OTHER PUBLICATIONS

English translation of International Preliminary Report on Patentability (Chapter I) (Application No. PCT/JP2018/000598) dated Aug. 1, 2019, 12 pages.

(Continued)

*Primary Examiner* — Joseph L Williams
(74) *Attorney, Agent, or Firm* — Burr & Brown, PLLC

(57) ABSTRACT

A predetermined lighting pattern is projected on a surface to be illuminated and the lighting pattern is displaced on the surface to be illuminated. A laser beam generated by a laser light source is broadened by a magnifying lens so as to generate a divergent light. The divergent light is shaped by the collimation lens into a parallel illumination light, and the parallel illumination light is caused to be incident on an incident plane of a diffraction optical element which records a hologram image. A diffracted light from the diffraction optical element forms the lighting pattern as a hologram reconstructed image on the surface to be illuminated. By translating the collimation lens by a collimation-lens drive unit along a movement plane that is orthogonal to an optical (Continued)

axis of the laser beam, the lighting pattern can be displaced on the surface to be illuminated.

14 Claims, 5 Drawing Sheets

(51) Int. Cl.
    *F21V 14/06*         (2006.01)
    *G02B 5/32*         (2006.01)
    *F21V 5/04*         (2006.01)
    *B60Q 1/34*         (2006.01)

(52) U.S. Cl.
    CPC ................ *G02B 5/32* (2013.01); *B60Q 1/34* (2013.01); *B60Q 2400/50* (2013.01); *G03H 2223/23* (2013.01)

(56) References Cited

FOREIGN PATENT DOCUMENTS

| | | |
|---|---|---|
| JP | 2012-099284 A1 | 5/2012 |
| JP | 2015-015128 A1 | 1/2015 |
| JP | 2015-132707 A1 | 7/2015 |
| WO | 2016/072505 A1 | 5/2016 |

OTHER PUBLICATIONS

International Search Report and Written Opinion (Application No. PCT/JP2018/000598) dated Mar. 27, 2018.
An Extended European Search Report (Application No. 18741622.7) dated Jul. 6, 2020.

\* cited by examiner

ILLUMINATION DEVICE

FIELD OF THE INVENTION

The present invention relates to an illumination device. Particularly, the present invention relates to an illumination device that illuminates a predetermined surface to be illuminated by diffracting a light (light beam) from a light source by means of a diffraction optical element.

BACKGROUND OF THE INVENTION

Recently, an illumination device having a function of forming a predetermined lighting pattern (a desired projection pattern) on a surface to be illuminated, by means of a high-intensity light source such as a laser, has been practically used. A diffraction optical element such as a hologram has a function of diffracting and emitting an incident light in a desired direction. Thus, by diffracting a light from a light source in a desired direction by means of a diffraction optical element, a predetermined lighting pattern can be formed on a surface to be illuminated.

For example, below Patent Document 1 discloses a technique wherein an illumination device having a function of diffracting a light emitted from a laser light source by means of a transmission-type hologram is installed on an automobile, so as to form a predetermined lighting pattern formed of a hologram reconstructed image on a road surface. When information such as a character is recorded in a hologram in advance by using this technique, a reconstructed image such as a character can be displayed as a lighting pattern on a road surface.

Patent Document 1: JP2015-132707A

As described above, the illumination device disclosed in Patent Document 1 can project a predetermined lighting pattern on a surface to be illuminated such as a road surface, etc. Upon designing, a designer determines a shape of a lighting pattern, and a position at which the lighting pattern is formed on the surface to be illuminated. Namely, the designer determines in advance a surface to be illuminated which has a predetermined geometric positional relationship with respect to an illumination device, and designs diffraction properties of a diffraction optical element such that a lighting pattern having a predetermined shape is formed at a predetermined position of the surface to be illuminated.

For example, when a hologram is used as a diffraction optical element, interference fringes, which allow a lighting pattern having a predetermined shape to be reconstructed, as a hologram reconstructed image, at a predetermined position of the predetermined surface to be illuminated, are recorded in the hologram. Thus, unless the hologram is replaced, the position of the lighting pattern projected on the surface to be illuminated is unchanged.

Meanwhile, as a new function of the aforementioned illumination device, it is desired that a position of a lighting pattern projected on a road surface or the like can be changed depending on circumstances. To be specific, when a lighting pattern of a direction indicating sign is projected on a road surface in order to show a traveling direction of a vehicle, it is preferable to change a position of the direction indicating sign depending on circumstances.

For example, when the aforementioned illumination device is installed on an automobile, and a direction indicating sign is projected on a road surface from the moving automobile, it is preferable that a projection position is changed such that a display position of the direction indicating sign on the road surface is appropriate, depending on traveling conditions such as a driving speed of the automobile and lane change. However, a conventional illumination device cannot change a projection position of a lighting pattern.

SUMMARY OF THE INVENTION

Thus, the object of the present invention is to provide an illumination device which is capable of projecting a predetermined lighting pattern on a surface to be illuminated, such as a road surface, a ground surface, a floor surface, a surface below water, and a wall surface, and is capable of displacing the lighting pattern on the surface to be illuminated.

SUMMARY OF THE INVENTION (1) A first aspect of the present invention is:
an illumination device that projects a predetermined lighting pattern (a desired projection pattern) on a surface to be illuminated, comprising:
a light source;
a collimation lens that shapes a light from the light source into a parallel illumination light;
a diffraction optical element that diffracts the parallel illumination light so as to project the lighting pattern on the surface to be illuminated; and
a collimation-lens drive unit that supports the collimation lens and drives the same;
wherein the collimation-lens drive unit translates the collimation lens in a predetermined direction of motion that is not parallel to an optical axis of the light incident on the collimation lens.

(2) A second aspect of the present invention is that, in the illumination device according to the aforementioned first aspect,
the collimation-lens drive unit translates the collimation lens along a movement plane that is orthogonal to the optical axis of the light incident on the collimation lens.

(3) A third aspect of the present invention is that, in the illumination device according to the aforementioned second aspect,
it further comprises a magnifying lens disposed between the light source and the collimation lens, wherein the light source generates a light beam, the magnifying lens broadens the light beam so as to generate a divergent light, and the collimation lens shapes the divergent light so as to generate a parallel illumination light.

(4) A fourth aspect of the present invention is that, in the illumination device according to the aforementioned third aspect,
when an XYZ three-dimensional coordinate system having an X axis, a Y axis and a Z axis that are orthogonal to one another is defined;
the light source generates a light beam having an optical axis parallel to the X axis;
the magnifying lens generates a divergent light that diverges about the optical axis;
the collimation lens shapes the divergent light so as to generate a parallel illumination light;
the diffraction optical element has an incident plane parallel to a YZ plane; and
the collimation-lens drive unit drives the collimation lens such that the collimation lens is translated along a movement plane parallel to the YZ plane, so that an incident direction of the parallel illumination light with respect to the incident plane is changed by the driving operation.

(5) A fifth aspect of the present invention is that, in the illumination device according to the aforementioned fourth aspect, the diffraction optical element is formed of a hologram recording medium that is disposed such that the incident plane is parallel to the YZ plane, and the hologram recording medium records interference fringes for generating a reconstructed image serving as the lighting pattern on the surface to be illuminated parallel to an XY plane.

(6) A sixth aspect of the present invention is that, in the illumination device according to the aforementioned third to fifth aspects, it further comprises a device housing that accommodates the light source, the magnifying lens, the collimation lens, the diffraction optical element and the collimation-lens drive unit, and fixedly supports the light source, the magnifying lens, the diffraction optical element and the collimation-lens drive unit.

(7) A seventh aspect of the present invention is that, in the illumination device according to the aforementioned first to sixth aspects, it comprises a plurality of light sources the number of which is n, and a plurality of collimation lenses the number of which is n, the collimation lenses being disposed correspondingly to the plurality of light sources;

each collimation lens shapes a light from the corresponding light source into a parallel illumination light, and applies the parallel illumination light to a predetermined corresponding irradiation area of a diffraction optical element, and the corresponding irradiation area diffracts the applied parallel illumination light so as to project the lighting pattern on the surface to be illuminated; and the collimation-lens drive unit translates at least one of the plurality of collimation lenses.

(8) An eighth aspect of the present invention is:

an illumination device that projects a predetermined lighting pattern on a surface to be illuminated, comprising:

a light source;

a collimation lens that shapes a light from the light source into a parallel illumination light;

a diffraction optical element that diffracts the parallel illumination light so as to project the lighting pattern on the surface to be illuminated; and a light-source drive unit that supports the light source and drives the same;

wherein the light-source drive unit translates the light source in a predetermined direction of motion that is not parallel to an optical axis of a light generated by the light source.

(9) A ninth aspect of the present invention is that, in the illumination device according to the aforementioned eighth aspect, the light-source drive unit translates the light source along a movement plane that is orthogonal to the optical axis of the light generated by the light source.

(10) A tenth aspect of the present invention is that, in the illumination device according to the aforementioned ninth aspect, it further comprises a magnifying lens disposed between the light source and the collimation lens, wherein:

the light source generates a light beam, the magnifying lens broadens the light beam so as to generate a divergent light, and the collimation lens shapes the divergent light so as to generate a parallel illumination light; and the magnifying lens is moved together with the light source.

(11) An eleventh aspect of the present invention is that, in the illumination device according to the tenth aspect, when an XYZ three-dimensional coordinate system having an X axis, a Y axis and a Z axis that are orthogonal to one another is defined;

the light source generates a light beam having an optical axis parallel to the X axis;

the magnifying lens generates a divergent light that diverges about the optical axis;

the collimation lens shapes the divergent light so as to generate a parallel illumination light;

the diffraction optical element has an incident plane parallel to a YZ plane; and the light-source drive unit drives the light source such that the light source is translated along a movement plane parallel to the YZ plane, so that an incident direction of the parallel illumination light with respect to the incident plane is changed by the driving operation.

(12) A twelfth aspect of the present invention is that, in the illumination device according to the aforementioned eleventh aspect, the diffraction optical element is formed of a hologram recording medium that is disposed such that the incident plane is parallel to the YZ plane, and the hologram recording medium records interference fringes for generating a reconstructed image serving as the lighting pattern on the surface to be illuminated parallel to an XY plane.

(13) A thirteenth aspect of the present invention is that, in the illumination device according to the aforementioned tenth to twelfth aspects, it further comprises a device housing that accommodates the light source, the magnifying lens, the collimation lens, the diffraction optical element and the light-source drive unit, and fixedly supports the collimation lens, the diffraction optical element and the light-source drive unit, wherein the magnifying lens is fixed on the light source and is moved together with the light source.

A fourteenth aspect of the present invention is that, in the illumination device according to the aforementioned eighth to thirteenth aspects, it comprises a plurality of light sources the number of which is n, and a plurality of collimation lenses the number of which is n, the collimation lenses being disposed correspondingly to the plurality of light sources;

each collimation lens shapes a light from the corresponding light source into a parallel illumination light, and applies the parallel illumination light to a predetermined corresponding irradiation area of a diffraction optical element, and the corresponding irradiation area diffracts the applied parallel illumination light so as to project the lighting pattern on the surface to be illuminated; and the light-source drive unit translates at least one of the plurality of light sources.

According to the illumination device of the present invention, it is possible to project a desired lighting pattern on a surface to be illuminated, such as a road surface, a ground surface, a floor surface, a surface below water, and a wall surface, and further to displace the lighting pattern on the surface to be illuminated.

DETAILED DESCRIPTION OF THE INVENTION

Figure 1:
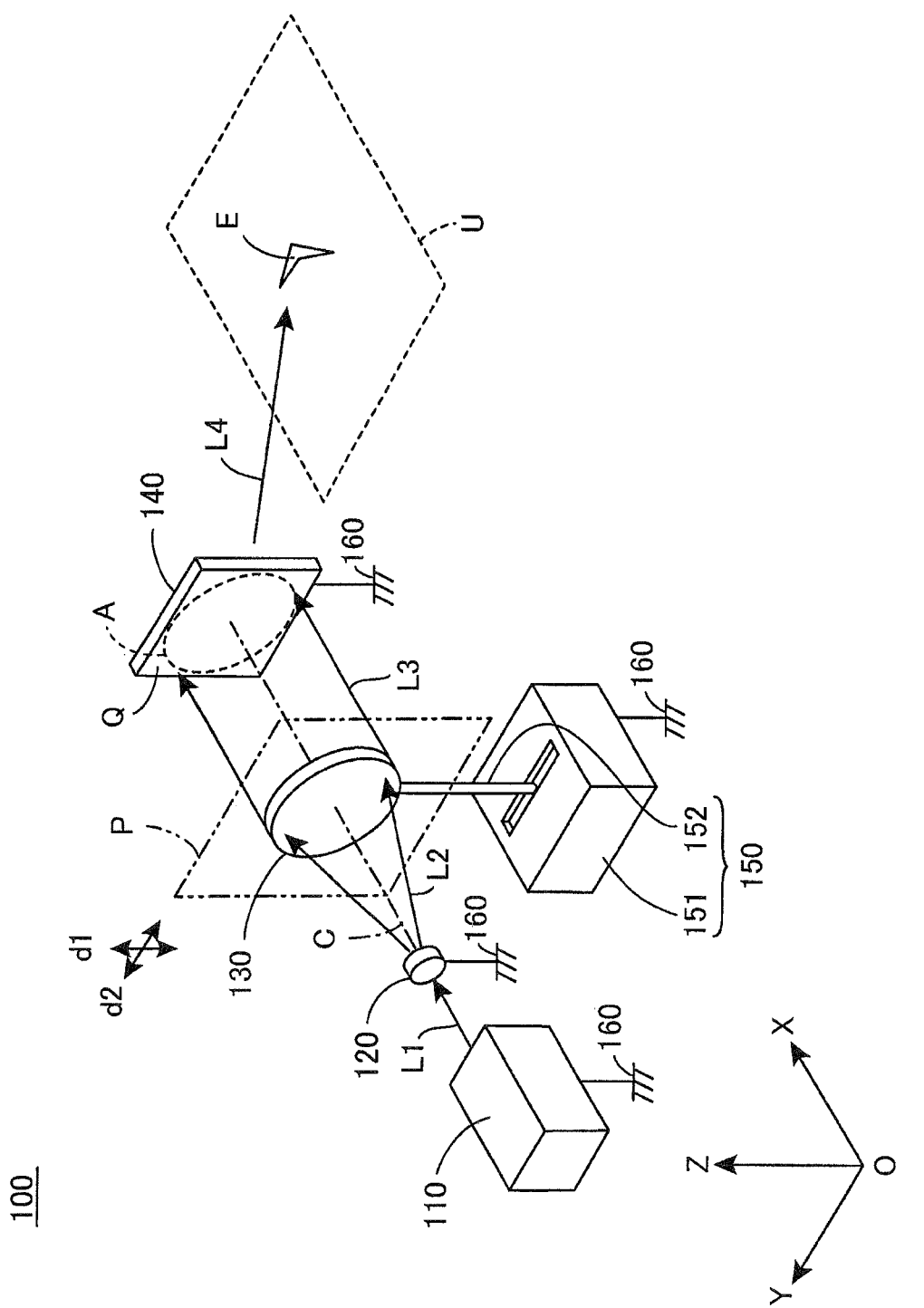
FIG. 1 is a perspective view showing an overall structure of an illumination device 100 according to a first embodiment of the present invention.

The present invention is described herebelow based on some illustrated embodiments. In the drawings attached to the specification, a scale size, an aspect ratio and so on are changed and exaggerated from the actual ones, for the convenience of easiness in illustration and understanding. In addition, terms specifying shapes and geometric conditions, e.g., "parallel", "orthogonal", "same", etc. and a value of a length, an angle, etc., are not limited to their strict definitions, but are to be construed to include a range capable of exerting a similar function.

§ 1. First Embodiment

Firstly, a first embodiment (embodiment in which a collimation lens is driven) of the present invention is described with reference to FIGS. 1 to 4.

<1.1 Basic Structure of First Embodiment>

FIG. 1 is a perspective view showing an overall structure of an illumination device 100 according to the first embodiment of the present invention. The illumination device 100 is an illumination device having a function of projecting a predetermined lighting pattern (a desired projection pattern) E on a predetermined surface to be illuminated U.

The surface to be illuminated U is a plane that forms an area to be illuminated by the illumination device 100. In FIG. 1, for the sake of convenience, the surface to be illuminated U is drawn as a rectangular area surrounded by dashed lines. In the illustrated example, the lighting pattern E is a V-shaped graphic pattern, but the shape and the size of the lighting pattern E are not limited to those of the illustrated example, and the lighting pattern E may have any optional shape. For example, the lighting pattern E may have a linear shape or a shape of a specific character (this applies to the respective embodiments described later).

For example, the illumination device 100 can be used by installing it on a vehicle such as an automobile or an aircraft. When the illumination device 100 is used by installing it on a vehicle, information like a traveling direction of the vehicle can be displayed as a lighting pattern E on a surrounding surface to be illuminated such as a road surface, a ground surface, a floor surface, a surface below water, and a wall surface. Described herein is an example in which the illumination device 100 is installed on an automobile, and a forward road surface is illuminated such that a lighting pattern E of a direction indicating sign showing its traveling direction (a V-shaped graphic pattern in this illustrated example) is formed. Thus, in the illustrated example, the surface to be illuminated U is set as a road surface in front of the automobile, and the V-shaped lighting pattern E shows a traveling direction of the automobile.

As illustrated, the illumination device 100 comprises a light source 110, a magnifying lens 120 that broadens a light beam L1 from the light source 110 so as to generate a divergent light L2, a collimation lens 130 that shapes a light from the light source 110 (the divergent light L2 generated by the magnifying lens 120) so as to generate a parallel illumination light L3, a diffraction optical element 140 that diffracts the parallel illumination light L3 so as to project a lighting pattern E on a surface to be illuminated U (in this example, on a forward road surface), and a collimation-lens drive unit 150 that supports the collimation lens 130 and drives the same.

Although illustration of a specific structure is omitted, the illumination device 100 further comprises a device housing 160. The device housing 160 is a housing that accommodates the light source 110, the magnifying lens 120, the collimation lens 130, the diffraction optical element 140 and the collimation-lens drive unit 150. In the illustrated example, the device housing 160 is installed on a front part of the automobile. The device housing 160 also has a function of fixedly supporting the light source 110, the magnifying lens 120, the diffraction optical element 140 and the collimation-lens drive unit 150.

In FIG. 1, in order to clearly show the fixedly supporting function, discrete parts of the device housing 160 are shown by using ground symbols of an electric circuit. Specifically, in FIG. 1, lines extending downward from the light source 110, the magnifying lens 120, the diffraction optical element 140 and the collimation-lens drive unit 150 and ground symbols 160 shown on lower ends of the lines show that these respective constituent elements are fixedly supported by the device housing 160. The collimation lens 130 is supported by the collimation-lens drive unit 150 so as to be movable with respect to the device housing 160. A driving method of the collimation lens 130 by the collimation-lens drive unit 150 is described in detail in the following § 1.2.

Herein, for the convenience of describing a geometric positional relationship among the respective constituent elements that constitute the illumination device 100, an XYZ three-dimensional orthogonal coordinate system having an X axis, a Y axis and a Z axis that are orthogonal to one another is defined as shown in the drawings. In the illustrated example, the illumination device 100 is installed on the automobile such that its traveling direction corresponds to a positive X direction, and the surface to be illuminated U (forward road surface) is defined on a plane parallel to an XY plane. In order to illuminate the surface to be illuminated U, the light source 110 has a function of emitting an illumination light beam L1 in the positive X direction. The collimation lens 130 and the diffraction optical element 140 are disposed on planes parallel to a YZ plane.

In this example, a laser light source is used as the light source 110. A laser light (beam) emitted from the laser light source 110 is excellent in travelling straight and thus is suited as a light for illuminating the surface to be illuminated U to form the fine lighting pattern E.

As illustrated, the laser beam L1 generated by the light source 110 is broadened by the magnifying lens 120 so that the divergent light L2 is generated. The magnifying lens 120 refracts the layer beam L1 so as to diverge the laser beam L1 into a divergent luminous flux, such that an area occupied by the light spreads in a cross-section orthogonal to the optical axis of the laser beam L1. In other words, the magnifying lens 120 shapes a three-dimensional shape of a luminous flux of the laser beam L1. In the example shown here, the laser beam L1 is a luminous flux having a circular section. The divergent light L2 of a conically spreading luminous flux is emergent from the magnifying lens 120. In FIG. 1, an optical axis C (an optical axis of the light L2 incident on the collimation lens 130) of the divergent light L2 is drawn with one-dot chain lines. The optical axis C is an axis parallel to the X axis.

The collimation lens 130 shapes the three-dimensional shape of the conically spreading divergent light L2 so as to generate a parallel illumination light L3 of a parallel luminous flux, and applies the parallel illumination light L3 to an incident plane Q of the diffraction optical element 140. In the illustrated example, the respective constituent elements are disposed such that the optical axis of the laser beam L1 passes a center point of the magnifying lens 120, that the optical axis C of the divergent light L2 (a center axis of the conically spreading divergent luminous flux) passes a center point of the collimation lens 130, and that an optical axis of the parallel illumination light L3 (a center axis of the parallel luminous flux) passes a center point of the diffraction optical element 140. In this patent application, "an optical axis of a certain light" means "a direction axis along an optical path that follows the center of an area through which the light passes".

Thus, in the illustrated example, the optical axis of the laser beam L1, the optical axis C of the divergent light L2 and the optical axis of the parallel illumination light L3 coincide with one another. These axes are axes parallel to the X axis. Herein, this state is referred to as "standard state". In the standard state, the parallel illumination light L3 forms a parallel luminous flux parallel to the X axis, and has a circular section (a section orthogonal to the optical axis). The diffraction optical element 140 is disposed such that its incident plane Q is parallel to the YZ plane. Thus, in the standard state, the parallel illumination light L3 is incident perpendicularly on the incident plane Q of the diffraction optical element 140. As a result, as indicated by broken lines, a circular irradiation area A is formed on the incident plane Q.

However, as described below, when the collimation lens 130 is driven by the collimation-lens drive unit 150 to deviate from the standard state, the optical axis of the parallel illumination light L3 does not coincide with the optical axis C of the divergent light L2 (the optical axis of the light incident on the collimation lens 130), and an incident angle of the parallel illumination light L3 with respect to the incident plane Q is changed. In this case, the irradiation area A on the diffraction optical element 140 has not a precisely circular shape but a slightly deformed elliptic shape.

Next, a function of the diffraction optical element 140 is described. The diffraction optical element 140 has a function of diffracting the parallel illumination light L3, which has been shaped by the collimation lens 130 and has been incident on the incident plane Q, so as to generate a diffracted light L4, and projecting a lighting pattern E on a surface to be illuminated U by the thus obtained diffracted light L4. By causing the parallel illumination light L3 to be incident on the incident plane Q of the diffraction optical element 140 from a certain direction (a perpendicular direction in the standard state), the incident light is diffracted in a desired direction so that the lighting pattern E can be formed at a predetermined position by the diffracted light L4.

In the example shown here, the diffraction optical element 140 is formed of a hologram recording medium that records interference fringes corresponding to a center wavelength of the laser beam L1 emitted from the laser light source 110, and is disposed parallel to the YZ plane. The hologram recording medium records interference fringes for generating a reconstructed image serving as a predetermined lighting pattern E (a V-shaped graphic pattern) on a surface to be illuminated U (on a forward road surface). By variously adjusting an interference fringe pattern to be recorded, a traveling direction of the diffracted light L4 that is diffracted by the diffraction optical element 140 can be controlled, whereby the predetermined lighting pattern E can be formed.

A geometric positional relationship between the diffraction optical element 140 and the surface to be illuminated U depends on a position on which the device housing 160 is installed on the automobile and a position at which the lighting pattern E is designed to be projected. For example, suppose that the device housing 160 is installed to face a traveling direction on a front grill of the automobile at a height position of 80 cm from the road surface, and that the lighting pattern E is designed to be projected on the road surface at a 80 m position ahead of the automobile. In this case, since a geometric positional relationship between the diffraction optical element 140 and the surface to be illuminated U can be defined based on the design information, interference fringes enabling that the predetermined lighting pattern E can be obtained as a reconstructed image on the surface to be illuminated U having such a geometric positional relationship is recoded in the diffraction optical element 140. Thus, the surface to be illuminated U is illuminated with the diffracted light from the diffraction optical element 140, and the lighting pattern E is formed as the illumination pattern on the road surface.

For example, the diffraction optical element 140 can be produced by using, as an object light, a scattered light from an actual scattering plate (diffuse plate). To be specific, when a hologram photosensitive material, which is a matrix of the diffraction optical element 140, is irradiated with an object light and a reference light which are coherent light interfering with each other, interference fringes by interference of the lights are formed in the hologram photosensitive material, so that the diffraction optical element 140 is produced. As an object light, a scattered light scattered by an economically available isotropic scattering plate can be used, and as a reference light, laser light which is coherent light can be used, for example.

For example, when the lighting pattern E of the V-shaped graphic pattern shown in FIG. 1 is generated as a reconstructed image, an actual isotropic scattering plate having a shape of the V-shape is prepared, and interference fringes are recorded by irradiating a hologram photosensitive material with a light as an object light which is obtained when the isotropic scattering plate is irradiated with the laser beam, and a laser light having the same wavelength as a reference light.

By using the hologram recording medium recording the interference fringes as the diffraction optical element 140, and by projecting a laser light toward the diffraction optical element 40 such that the laser light travels conversely to an optical path of the reference light used upon recording, a reconstructed image of the scattering plate is generated at a position on which the scattering plate, which originated the object light used when the diffraction optical element 140 was produced, is located. When the scattering plate, which originated the object light used when the diffraction optical element 140 was produced, has uniform planar scattering properties, the reconstructed image of the scattering plate, which is generated by the diffraction optical element 140, is also a uniform planar illumination area. This area, in which the reconstructed image of the scattering plate is generated, can be the lighting pattern E.

Instead of being formed by using a real object light and a real reference light, a complicated interference fringe pattern formed on each diffraction optical element 140 can be designed by using a computer based on a wavelength and an incident direction of expected illumination light for reconstruction as well as a shape and a position of an image to be reconstructed. The diffraction optical element 140 thus obtained is also referred to as computer generated hologram (CGH). For example, as in the aforementioned example, when it is designed that the lighting pattern E is projected on a road surface at an 80 m position ahead of the automobile, it is necessary to perform a recording with an object light from a scattering plate as far as 80 m, which is practically of great difficulty. In this case, a computer generated hologram is preferably used as the diffraction optical element 140.

When a computer generated hologram is used, for example, a Fourier conversion hologram in which respective points on each diffraction optical element 140 have the same diffusion angle properties may be generated by a computer. Further, an optical member such as a lens may be disposed on the downstream side of the diffraction optical element 140, in order that the overall area of the lighting pattern E is illuminated with the entire diffracted light L4 from the diffraction optical element 140.

Specifically, the diffraction optical element 140 may be a volume type hologram recording medium using a photopolymer, a volume type hologram recording medium that uses a photosensitive medium containing a silver salt material for recording, or a relief type (emboss type) hologram recording medium. A relief type hologram may be made of materials such as resin, glass, metal and organic/inorganic hybrid material. In addition, the diffraction optical element 140 may be of a transmission type or of a reflection type. In the illustrated example, a transmission type diffraction optical element 140 is used. On the other hand, when a reflection type diffraction optical element 140 is used, the light source 110 has to be disposed on the opposite side of the diffraction optical element 140.

A luminous flux emergent from such a diffraction optical element 140 has an outline corresponding to the pattern recorded in the diffraction optical element 140. Thus, the lighting pattern E having an outline corresponding to the interference fringes recorded in the diffraction optical element 140 is formed on the surface to be illuminated U that is illuminated with such a luminous flux.

In the illumination device 100 shown in FIG. 1, the light source 110 generates a light beam L1 having an optical axis parallel to the X axis, the magnifying lens 120 generates a divergent light L2 which diverges about the optical axis of the light beam L1 as a central axis, and the collimation lens 130 shapes the divergent light L2 so as to generate a parallel illumination light L3 and applies the parallel illumination light L3 to the diffraction optical element 140 having the incident plane Q parallel to the YZ plane. Moreover, the collimation lens 130 can be translated by the collimation-lens drive unit 150 along a movement plane P that is orthogonal to the optical axis C of the incident divergent light L2. Herein, the "translation" means that respective points constituting the collimation lens 130 are moved in the same direction by the same distance, without any rotating factor.

<1.2 Basic Operation of First Embodiment>

The feature of the present invention is to add, to the illumination device having a function of projecting a predetermined lighting pattern E on a predetermined surface to be illuminated U, a function of changing a projection position of the lighting pattern E.

For example, in the illustrated example, the illumination device is installed on an automobile. When a direction indicating sign is projected on a road surface from a moving automobile, it is convenient that a projection position can be changed such that a display position of the direction indicating sign on the road surface is appropriate depending on driving conditions of the automobile such as a driving speed of the automobile and lane change. The illustrated illumination device 100 has such a function of changing a projection position.

An important feature of the illumination device 100 according to the first embodiment is that the collimation lens 130 is driven by the collimation-lens drive unit 150. As described above, the light source 110, the magnifying lens 120, the diffraction optical element 140 and the collimation-lens drive unit 150 are all fixedly supported by the device housing 160. On the other hand, the collimation lens 130 is not directly fixed on the device housing 160 but is supported by the collimation-lens drive unit 150 so as to be movable.

Namely, a relative position between the collimation lens 130 and the device housing 160 is changed by the collimation-lens drive unit 150. This means that a relative position of the collimation lens 130 with respect to the light source 110, the magnifying lens 120 and the diffraction optical element 140 is also changed.

To be specific, the collimation-lens drive unit 150 has a function of translating the collimation lens 130 along the movement plane P (shown by two-dot chain lines in FIG. 1) that is orthogonal to the optical axis C of the light incident on the collimation lens 130 (an optical axis of the divergent light L2). In the illustrated example, since the optical axis C of the divergent light L2 is parallel to the X axis, the movement plane P is a plane parallel to the YZ plane.

In the example shown here, when a direction orthogonal to the surface to be illuminated U (the Z-axis direction) is referred to as a vertical direction d1, and a direction parallel to the surface to be illuminated U (a direction along the XY plane) is referred to as a horizontal direction d2, as shown by the arrows d1 and d2 in FIG. 1, the collimation-lens drive unit 150 has a vertically driving function of moving the collimation lens 130 along the movement plane P in the vertical direction d1, and a horizontally driving function of moving the collimation lens 130 along the movement plane P in the horizontal direction d2. By combining the vertically driving function and the horizontally driving function, the collimation lens 130 can be translated along the movement plane P, not only in the vertical direction d1 and the horizontal direction d2 but also in a given direction.

As illustrated, the collimation-lens drive unit 150 has a drive mechanism 151 and a support arm 152, and has a function of supporting the collimation lens 130 and translating the collimation lens 130 along the movement plane P (a plane parallel to the YZ plane) that is orthogonal to the optical axis C of a light incident on the collimation lens 130. As such a drive mechanism 151, a general mechanism for moving the support arm 152 with the use of a motor and gears can be employed, and detailed description thereof is omitted here.

The noteworthy thing here is that, when the collimation-lens drive unit 150 drives the collimation lens 130 such that the collimation lens 130 is translated along the movement plane P parallel to the YZ plane, an incident direction of the parallel illumination light L3 with respect to the incident plane Q is changed by the driving operation. Namely, in the standard state shown in FIG. 1, the parallel illumination light L3 is incident on the incident plane Q in a direction perpendicular thereto. However, when the collimation lens 130 is translated along the movement plane P, an incident direction of the parallel illumination light L3 with respect to the incident plane Q is changed in accordance with the direction of motion of the collimation lens 130 and the distance moved by the collimation lens 130, so that an emergent direction of the diffracted light L4 emergent from the diffraction optical element 140 is also changed. As a result, a projection position of the lighting pattern E on the surface to be illuminated U is also changed.

In other words, when the collimation lens 130 is moved, a light incident position of the light with respect to the collimation lens 130 is changed. In accordance with the displacement direction and the displacement quantity of the incident position, an emergent angle of the parallel illumination light L3 emergent from the collimation lens 130 is changed. Thus, an incident angle of the parallel light source L3 with respect to the diffraction optical element 140 is changed, so that an emergent direction of the diffracted light L4 emergent from the diffraction optical element 140 is changed, whereby a projection position of the lighting pattern E on the surface to be illuminated U is changed. In conclusion, in the first embodiment shown here, by changing a relative positional relationship between the light source 110 and the collimation lens 130, an incident angle of the parallel illumination light L3 with respect to the diffraction optical element 140 is changed.

Figure 2:
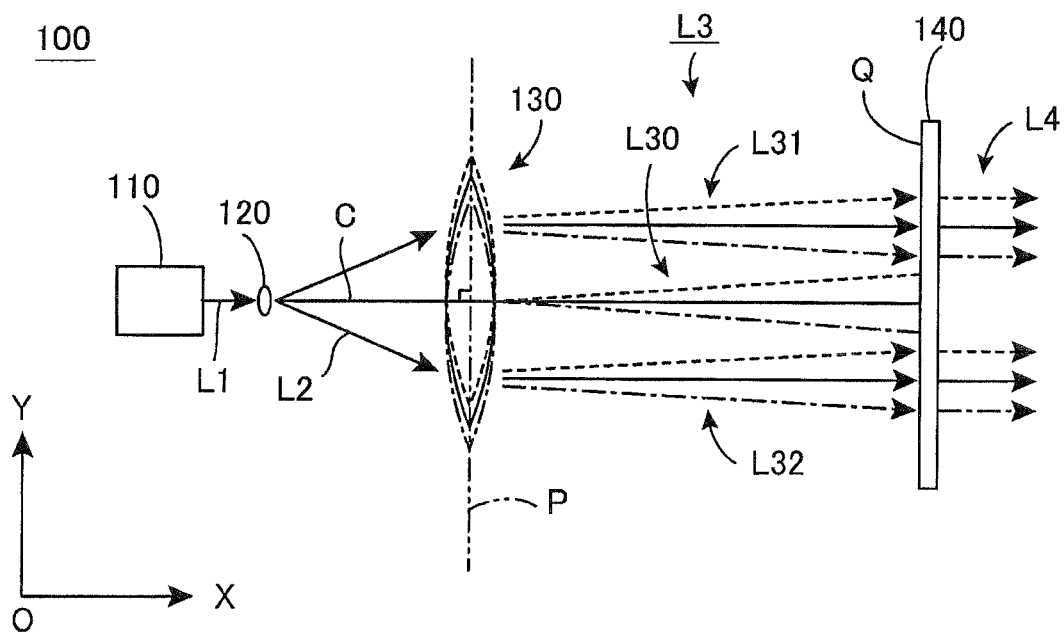
FIG. 2 is a top view of the illumination device 100 shown in FIG. 1 (illustration of some constituent elements is omitted).

FIG. 2 is a top view of the illumination device 100 shown in FIG. 1 (illustration of some constituent elements is omitted). As indicated by solid lines in FIG. 2, the laser beam L1 emitted from the light source 110 in the positive X direction is broadened by the magnifying lens 120 into the divergent light L2 having the optical axis C. The divergent light L2 is shaped by the collimation lens 130 into the parallel illumination light L3. The parallel illumination light L3 is incident on the incident plane Q of the diffraction optical element 140, and is emergent as the diffracted light L4 onto the surface to be illuminated U. As illustrated, the optical axis C of the divergent light L2 is orthogonal to the movement plane P of the collimation lens 130.

In FIG. 2, a line group L30 drawn on the right side of the collimation lens 130 shows an optical axis of the parallel illumination light L3, an arrow group L31 shows an optical path of a light beam on one of profile positions (an upper end position in FIG. 2) of luminous fluxes constituting the parallel illumination light L3, and an arrow group L32 shows an optical path of a light beam on the other profile position (a lower end position in FIG. 2) of the luminous fluxes constituting the parallel illumination light L3.

As illustrated, a profile line group of the collimation lens 130, the straight line group L30, and the arrow groups L31 and L32 are composed of three kinds of lines, namely, solid lines, broken lines and one-dot chain lines. The solid lines show a case in which the collimation lens 130 is positioned in the standard state. The broken lines show a case in which the collimation lens 130 is translated upward in FIG. 2 (positive Y direction). The one-dot chain lines show a case in which the collimation lens 130 is translated downward in FIG. 2 (negative Y direction). Herebelow, for the sake of convenience, when these three kinds of lines should be discriminated, the terms (solid line), (broken line) and (one-dot chain line) are affixed to a reference numeral. For example, an arrow drawn with the broken lines in the arrow group L31 is referred to as "arrow L31 (broken line)".

Similarly, an arrow group drawn on the right side of the diffraction optical element 140 shows an optical path of the diffracted light L4 from the diffraction optical element 140, which is composed of solid lines, broken lines and one-dot chain lines. Also, the solid lines show a case in which the collimation lens 130 is positioned in the standard state. The broken lines show a case in which the collimation lens 130 is translated upward in FIG. 2 (positive Y direction). The one-dot chain lines show a case in which the collimation lens 130 is translated downward in FIG. 2 (negative Y direction). Herebelow, for the sake of convenience, when these three kinds of lines should be discriminated, the terms (solid line), (broken line) and (one-dot chain line) are affixed to the reference numeral L4. For example, of the diffracted light L4, the diffracted light shown by an arrow drawn with the broken lines is referred to as "diffracted light L4 (broken line)".

As described above, the solid lines in FIG. 2 show the standard state. In the standard state, the optical axis of the laser beam L1, the optical axis C of the divergent light L2 and the optical axis of the parallel illumination light L3 are positioned on the same line. Namely, in the standard state, the optical axis of the laser beam L1 passes the center point of the magnifying lens 120, the optical axis C of the divergent light L2 passes the center point of the collimation lens 130, and the optical axis of the parallel illumination light L3 passes the center point of the diffraction optical element 140. Parallel luminous fluxes within a range between the arrow L31 (solid line) and the arrow L32 (solid line) are emergent as the parallel illumination light L3 from the collimation lens 130 and are incident on the incident plane Q of the diffraction optical element 140 in a direction perpendicular thereto. In this case, the irradiation area A formed in the incident plane Q is a circular area as shown by the broken lines in FIG. 1. The diffracted light L4 (solid line) is emergent from the diffraction optical element 140, so that the lighting pattern E is projected at a standard position on the surface to be illuminated U.

On the other hand, as shown by the broken lines in FIG. 2, when the collimation lens 130 is translated along the movement plane P upward in FIG. 2 (positive Y direction), the position of the optical axis C of the divergent light L2 from the magnifying lens 120 is unchanged, but a relative position of the collimation lens 130 with respect to the optical axis C is changed. Thus, an incident position of the divergent light L2 with respect to the collimation lens 130 is changed in accordance with the direction of motion and the movement quantity of the collimation lens 130. Thus, an emergent angle of the parallel illumination light L3 emergent from the collimation lens 130 is changed in accordance with the incident position of the divergent light L2. Parallel luminous fluxes within a range between the arrow L31 (broken line) and the arrow L32 (broken line) are emergent as the parallel illumination light L3 (broken line) from the collimation lens 130. Although the parallel illumination light L3 (broken line) is composed of parallel luminous fluxes of light beams parallel to each other, the parallel illumination light L3 is inclined to the optical axis C of the divergent light L2 and is not parallel to the X axis.

Thus, an incident angle of the parallel illumination light L3 (broken line) with respect to the incident plane Q of the diffraction optical element 140 differs from the incident angle in the aforementioned standard state. In addition, the irradiation area A formed in the incident plane Q is not of a precisely circular shape but of a slightly deformed elliptic shape. In addition, a formation position thereof is slightly shifted from the position in the standard state. Namely, since the incident angle of the parallel illumination light L3 is changed, the diffracted light L4 (broken line), which is oriented in a direction different from that of the diffracted light L4 (solid line), is emergent from the diffraction optical element 140, whereby the lighting pattern E is projected on the surface to be illuminated U at a position which is different from the standard position (in the illustrated example, a position displaced in the positive Y direction from the standard position).

On the other hand, as shown by the one-dot chain lines in FIG. 2, when the collimation lens 130 is translated along the movement plane P downward in FIG. 2 (negative Y direction), the position of the optical axis C of the divergent light L2 from the magnifying lens 120 is unchanged, but a relative position of the collimation lens 130 with respect to the optical axis C is changed. Thus, an incident position of the divergent light L2 with respect to the collimation lens 130 is changed in accordance with the direction of motion and the movement quantity of the collimation lens 130. Thus, an emergent angle of the parallel illumination light L3 emergent from the collimation lens 130 is changed in accordance with the incident position of the divergent light L2. Parallel luminous fluxes within a range between the arrow L31 (one-dot chain line) and the arrow L32 (one-dot chain line) are emergent as the parallel illumination light L3 (one-dot chain line) from the collimation lens 130. Although the parallel illumination light L3 (one-dot chain line) is composed of parallel luminous fluxes of light beams parallel to each other, the parallel illumination light L3 is inclined to the optical axis C of the divergent light L2 and is not parallel to the X axis.

Thus, an incident angle of the parallel illumination light L3 (one-dot chain line) on the incident plane Q of the diffraction optical element 140 differs from the incident angle in the aforementioned standard state. Of course, the incident angle also differs from the incident angle of the parallel illumination light L3 (broken line). The irradiation area A formed in the incident plane Q has also an elliptic shape, and a formation position thereof is also slightly shifted from the position in the standard state. Namely, since the incident angle of the parallel illumination light L3 is changed, the diffracted light L4 (one-dot chain line), which is oriented in a direction different from those of the diffracted light L4 (solid line) and the diffracted light L4 (broken line), is emergent from the diffraction optical element 140, whereby the lighting pattern E is projected on the surface to be illuminated U at a position which is different from the standard position (in the illustrated example, a position displaced in the negative Y direction from the standard position).

In the case of the illumination device 100 shown in FIG. 1, when the collimation lens 130 is translated along the movement plane P in the horizontal direction d2 (a direction parallel to the Y axis) by the collimation-lens drive unit 150, the lighting pattern E projected on the surface to be illuminated U is displaced in the right and left direction (a direction parallel to the Y axis) seen from the automobile.

On the other hand, in the illumination device 100 shown in FIG. 1, when the collimation lens 130 is translated along the movement plane P in the vertical direction d1 (a direction parallel to the Z axis), the lighting pattern E projected on the surface to be illuminated U is displaced in the traveling direction (a direction parallel to the X axis) seen from the automobile. The reason why such a displacement occurs can be easily understood in consideration that, in the side view of the illumination device 100 shown in FIG. 1, the Y axis of the top view of FIG. 2 is replaced with the Z axis.

Namely, in consideration of the side view in which the Y axis in FIG. 2 is replaced with the Z axis, the solid lines show the case in which the collimation lens 130 is arranged in its position in the standard state, the broken lines show the case in which the collimation lens 130 is translated vertically upward (positive Z direction), and the one-dot chain lines show the case in which the collimation lens 130 is translated vertically downward (negative Z direction). As shown in FIG. 1, when the lighting pattern E is formed on the surface to be illuminated U in the forward road surface by the illumination device 100 installed on the automobile, the orientation of the diffracted light L4 in FIG. 2 as the side view needs to be amended slightly downward.

As indicated by the broken lines in the side view, when the collimation lens 130 is translated along the movement plane P vertically upward (positive Z direction), the diffracted light L4 (broken line) is emerged from slightly above the diffracted light L4 (solid line), so that the lighting pattern E is projected on the surface to be illuminated U at a position farther than the position of the lighting pattern E in the standard position (a position displaced in the positive X direction from the standard position). Similarly, when the collimation lens 130 is translated along the movement plane P vertically downward (negative Z direction), the diffracted light L4 (one-dot chain line) is emerged from slightly below the diffracted light L4 (solid line), so that the lighting pattern E is projected on the surface to be illuminated U at a position closer than the position of the lighting pattern E in the standard position (a position displaced in the positive X direction from the standard position).

To sum up, in the illumination device 100 shown in FIG. 1, when the collimation lens 130 is translated by the collimation-lens drive unit 150 along the movement plane P in the vertical direction d1 (a direction parallel to the Z axis), the lighting pattern E projected on the surface to be illuminated U is displaced in the traveling direction of the automobile (a direction parallel to the X axis).

Figure 3:
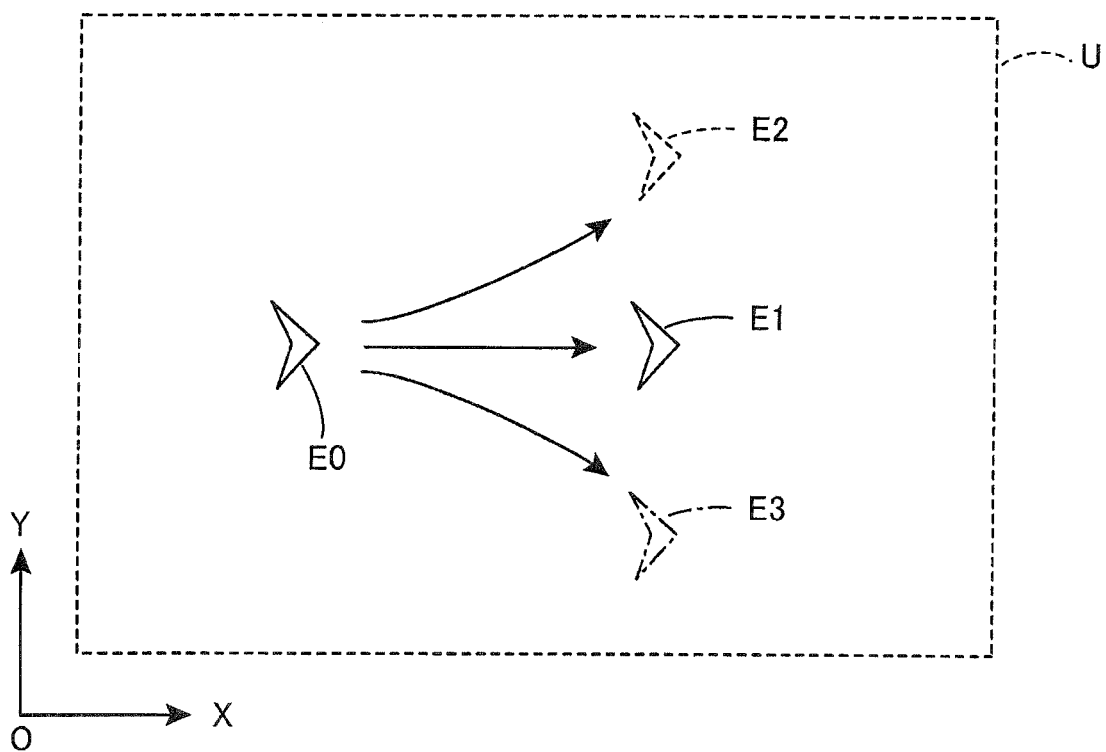
FIG. 3 is a plan view for describing a displacement state of a lighting pattern E projected by the illumination device 100 shown in FIG. 1 on a surface to be illuminated U.

FIG. 3 is a plan view for describing a displacement state of the lighting pattern E projected by the illumination device 100 shown in FIG. 1 on the surface to be illuminated U. A lighting pattern E0 shown by the solid lines in FIG. 3 shows a pattern projected on the surface to be illuminated U in the standard state. In this standard state, when the collimation lens 130 is translated along the movement plane P vertically upward (positive Z direction), as described above, the lighting pattern E0 is displaced to a farther position seen from the automobile, so that a lighting pattern E1 shown by the solid lines in FIG. 3 is obtained.

On the other hand, in the standard state, when the collimation lens 130 is translated along the movement plane P vertically upward (positive Z direction) and is translated horizontally leftward (positive Y direction), the lighting pattern E0 is displaced, on the surface to be illuminated U, to a farther and leftward position seen from the automobile, so that a lighting pattern E2 shown by the broken lines in FIG. 3 is obtained. Similarly, in the standard state, when the collimation lens 130 is translated along the movement plane P vertically upward (positive Z direction) and is translated horizontally rightward (negative Y direction), the lighting pattern E0 is displaced, on the surface to be illuminated U, to a farther and rightward position seen from the automobile, so that a lighting pattern E3 shown by the one-dot chain lines in FIG. 3 is obtained.

As described above, the collimation-lens drive unit 150 in the illumination device 100 shown in FIG. 1 has the vertically driving function of moving the collimation lens 130 along the movement plane P in the vertical direction d1, and the horizontally driving function of moving the collimation lens 130 along the movement plane P in the horizontal direction d2, as shown by the arrows d1 and d2 in FIG. 1. Thus, by combining the vertically driving function and the horizontally driving function, the collimation lens 130 can be translated along the movement plane P, not only in the vertical direction d1 and the horizontal direction d2 but also in a given direction.

As a result, an incident angle of the parallel illumination light L3 with respect to the diffraction optical element 140 is changed, so that an emergent angle of the diffracted light L4 emergent from the diffraction optical element 140 can be changed, whereby the lighting pattern E can be moved to a given position on the surface to be illuminated U. FIG. 3 shows that the lighting pattern E0 in the standard state is displaced to the lighting patterns E1 to E3 at distant positions from the illumination device 100. However, it goes without saying that the lighting pattern E0 can be displaced to a position closer to the illumination device 100. In particular, when a distant area is illuminated by the illumination device 100, a formation position of the lighting pattern E can be significantly displaced only by moving slightly the collimation lens 130.

When the lighting pattern E is displaced from its position in the standard state, a profile, in particular, an outline of a luminous flux of the diffracted light L4 from the diffraction optical element 140 is slightly changed, so that the lighting pattern E (the V-shaped graphic pattern) displayed on the surface to be illuminated U is slightly deformed in a precise sense. However, as long as the displacement quantity of the collimation lens 130 is not extremely large, the deformation of the lighting pattern E is negligible and no serious trouble practically occurs.

In addition, in the example shown in FIG. 1, in a case where the outline of the irradiation area A in the standard state is designed to reach a point close to the outline of the incident plane Q of the diffraction optical element 140, when the collimation lens 130 is translated along the movement plane P, a part of the irradiation area A protrudes from the incident plane Q. Specifically, in the case shown in FIG. 1, a part of the outline of the irradiation area A shown by the circle in the broken lines protrudes outside from the diffraction optical element 140. However, even if such a protrusion occurs, no serious problem occurs. This is because, since the diffraction optical element 140 records hologram interference fringes, even if the illumination light for reconstruction is applied to only a part of the diffraction optical element 140, the lighting pattern E is formed as a hologram reconstructed image. In this case, a protruding light is preferably cut by an aperture.

Of course, when a part of the parallel illumination light L3 protrudes from the hologram recording area, a quantity of light for illumination decreases, so that an irradiance of the lighting pattern E formed as a hologram reconstructed image decreases. In order to prevent decrease in irradiance, the size of the diffraction optical element 140 is designed slightly larger, such that the irradiation area A does not protrude from the hologram forming surface on the incident plane Q, even when the position of the irradiation area A formed on the incident plane Q of the diffraction optical element 140 is changed by the movement of the collimation lens 130.

However, when the size of the diffraction optical element 140 is designed to be larger for preventing protrusion, another problem occurs: the size of the illumination device 100 becomes larger as a whole. Thus, in terms of reduction in size of the device, as in the example shown in FIG. 1, it is preferable that the outline of the irradiation area A in the standard state is designed to reach a point close to the outline of the incident plane Q of the diffraction optical element 140, and that some protrusion of the irradiation area A is allowed.

Such a protrusion similarly occurs in the collimation lens 130. Namely, in FIG. 1, when the outline of the irradiation area of the conically spreading divergent light L2 with respect to the collimation lens 130 is designed to reach a point close to the outline of the collimation lens 130, there is a possibility that a part of the divergent light L2 protrudes outside from the collimation lens 130 by the movement of the collimation lens 130.

Even when such a protrusion occurs, no serious trouble occurs, although a quantity of light for illumination decreases and an irradiance of the lighting pattern E lowers (a protruding light is preferably cut by an aperture). When a size of the collimation lens 130 is designed to be larger, such a protrusion can be of course prevented. However, another problem occurs: the size of the illumination device 100 becomes larger as a whole.

<1.3 Modification Example of First Embodiment>

Next, some modification examples of the illumination device 100 according to the first embodiment shown in FIG. 1 are described.

Figure 4:
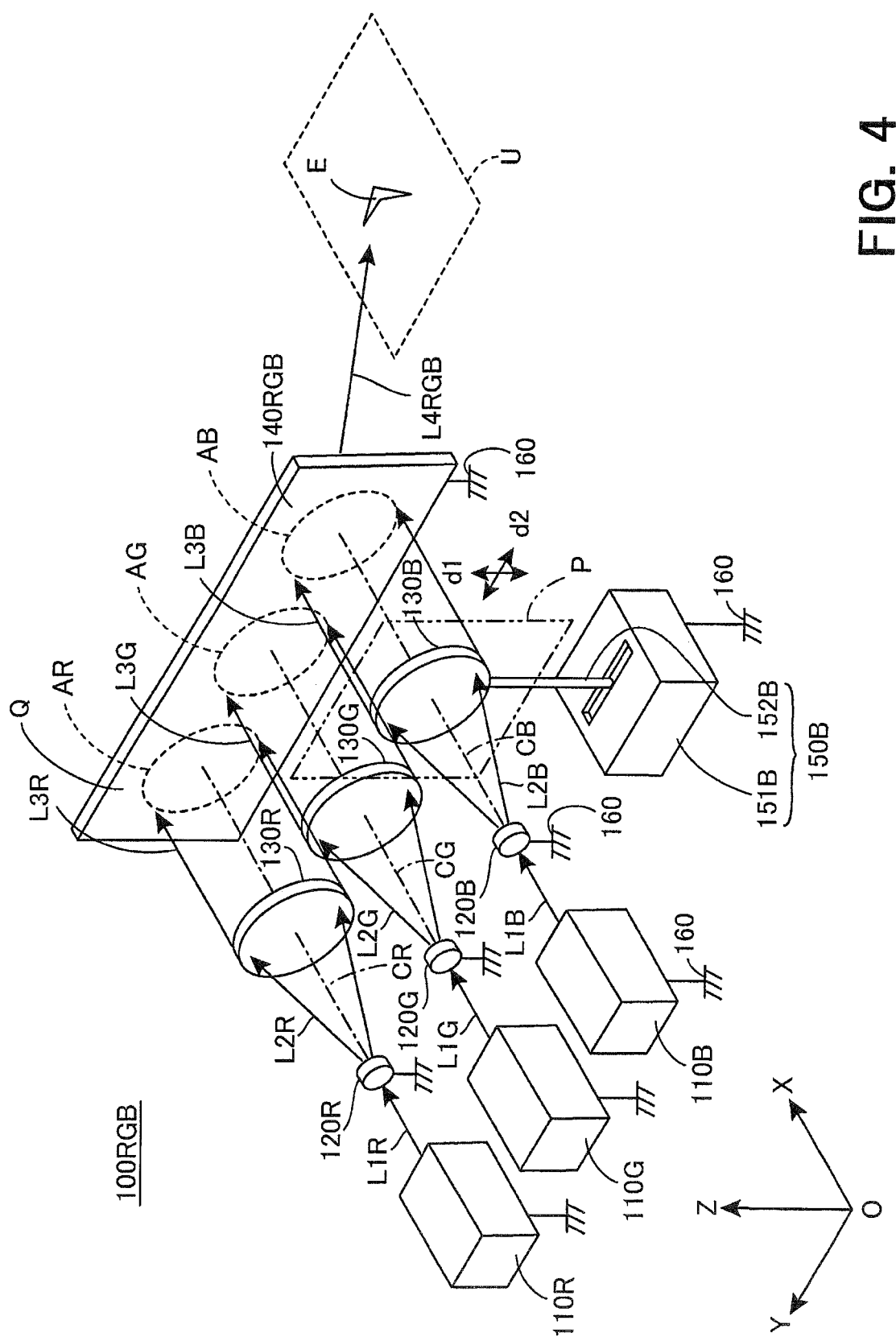
FIG. 4 is a perspective view of an overall structure of an illumination device 100RGB according to a modification example of the first embodiment shown in FIG. 1.

(1) Modification Example: Use of a Plurality of Light Sources and Collimation Lenses FIG. 4 is a perspective view showing an overall structure of an illumination device 100RGB according to a modification example of the first embodiment shown in FIG. 1. Similarly to FIG. 1, an XYZ three-dimensional orthogonal coordinate system is defined. A feature of the illumination device 100RGB is that it comprises three light sources 110R, 110G and 110B, three magnifying lenses 120R, 120G and 120B and three collimation lenses 130R, 130G and 130B, which are respectively disposed correspondingly to the three light sources. The respective three sets of those constituent elements are arranged side by side in the horizontal direction (Y-axis direction). In order to receive parallel illumination lights L3R, L3G and L3B from the respective collimation lenses 130R, 130G and 130B, the diffraction optical element 140RGB has a horizontally elongated shape.

The three light sources 110R, 110G and 110B are laser light sources that are basically similar to the light source 110 shown in FIG. 1, but have functions of generating lights of different wavelengths. To be specific, the light source 110R is a red laser light source that generates a red laser beam L1R, the light source 110G is a green laser light source that generates a green laser beam L1G, and the light source 110B is a blue laser light source that generates blue laser beam L1B. They emit the respective laser beams L1R, L1G and L1B in a direction parallel to the X axis. These light sources may either be provided as independent components, or be a light emission module in which the light sources are arranged on a common substrate.

The three magnifying lens 120R, 120G and 120B and the three collimation lens 130R, 130G and 130B are totally the same constituent elements as the magnifying lens 120 and the collimation lens 130 shown in FIG. 1. Thus, the red laser beam L1R generated by the red light source 110R is broadened by the magnifying lens 120R into a red divergent light L2R. The red divergent light L2R is further shaped by the collimation lens 130R into a red parallel illumination light L3R. The red parallel illumination light L3R is applied to a corresponding incident area AR (in the illustrated example, a circular area shown by broken lines) on an incident plane Q of the diffraction optical element 140RGB.

Similarly, a green laser beam L1G generated by the green light source 110G is broadened by the magnifying lens 120G into a green divergent light L2G. The green divergent light L2G is further shaped by the collimation lens 130G into a green parallel illumination light L3G. The green parallel illumination light L3G is applied to a corresponding incident area AG (in the illustrated example, a circular area shown by broken lines) on the incident plane Q of the diffraction optical element 140RGB. In addition, a blue laser beam L1B generated by the blue light source 110B is broadened by the magnifying lens 120B into a blue divergent light L2B. The blue divergent light L2B is further shaped by the collimation lens 130B into a blue parallel illumination light L3B. The blue parallel illumination light L3B is applied to a corresponding incident area AB (in the illustrated example, a circular area shown by broken lines) on the incident plane Q of the diffraction optical element 140RGB.

Similarly to the illumination device 100 shown in FIG. 1, in the standard state, an optical axis of the laser beam L1R, L1G, L1B, an optical axis CR, CG, CB of the divergent light L2R, L2G, L2B, and an optical axis of the parallel illumination light L3R, L3G and L3B are parallel to the X axis. However, when the collimation lens 130R, 130G, 130B is translated, the optical axis of the parallel illumination light L3R, L3G, L3B of each color is inclined to the X axis, and a shape and a formation position of the corresponding incident area AR, AG, AB of each color are slightly changed.

Similarly to the diffraction optical element 140 shown in FIG. 1, the diffraction optical element 140RGB has the incident plane Q parallel to the YZ plane, and has a function of diffracting the parallel illumination light L3R, L3G, L3B of each color into a diffracted light L4RGB and projecting a lighting pattern E on a surface to be illuminated U by the obtained diffracted light L4RGB. In the example shown here, a hologram interference fringe pattern, which records interference fringes corresponding to a center wavelength of the red laser beam L1R, is recorded in and near the red corresponding irradiation area AR in the incident plane Q of the diffraction optical element 140RGB. A hologram interference fringe pattern, which records interference fringes corresponding to a center wavelength of the green laser beam L1G, is recorded in and near the green corresponding irradiation area AG. A hologram interference fringe, which records interference fringes corresponding to a center wavelength of the blue laser beam L1B, is recorded in and near the blue corresponding irradiation area AB.

These hologram interference fringes are interference fringes for generating a reconstructed image as a predetermined lighting pattern E (V-shaped graphic pattern) on the surface to be illuminated U parallel to the XY plane. Thus, a red diffracted light from the red corresponding irradiation area AR, a green diffracted light from the green corresponding irradiation area AG and a blue diffracted light from the blue corresponding irradiation area AB all form a reconstructed image as the lighting pattern E at the same position on the surface to be illuminated U.

As a result, the lighting pattern E is a colored V-shaped graphic pattern formed by superimposing diffracted lights of three colors. A method of manufacturing the diffraction optical element 140RGB having hologram interference fringes for reconstructing such an image as above is the same as the method of manufacturing the diffraction optical element 140 shown in FIG. 1, and detailed description thereof is omitted here.

The three laser light sources 110R, 110G and 110B may have radiant fluxes different from one another. By adjusting the radiant fluxes [unit: W] of the three laser light sources 110R, 110G and 110B, a color of the lighting pattern E can be adjusted. In addition, in order to increase a light intensity, a plurality of the laser light sources may be provided for each of the emission wavelength ranges. In the illustrated example, the single diffraction optical element 140RGB is used. However, instead thereof, three diffraction optical elements 140R, 140G and 140B may be used, and the respective parallel incident lights L3R, L3G and L3B of respective color may be applied to the corresponding diffraction optical elements 140R, 140G and 140B. However, when the single diffraction optical element 140RGB is used, the incident plane Q is a continuous area. Thus, it can be restrained that the irradiation area AR, AG, AB formed by the parallel illumination area L3R, L3G, L3B of each color protrudes outside from the diffraction optical element.

The collimation-lens drive unit 150B is a constituent element similar to the collimation-lens drive unit 150 shown in FIG. 1. Namely, as illustrated, the collimation-lens drive unit 150B has a drive mechanism 151B and a support arm 152B, and has a function of supporting the collimation lens 130B and translating the collimation lens 130B along a movement plane P (a plane parallel to the YZ plane) that is orthogonal to the optical axis CB of the light incident on the collimation lens 130B.

Although not shown in FIG. 4 in order to avoid complexity, collimation-lens drive units 150R and 150G, which have the same structure as that of the collimation-lens drive unit 150B, are also provided. The collimation-lens drive unit 150R has a function of supporting the collimation lens 130R and translating the collimation lens 130R along a movement plane P (a plane parallel to the YZ plane) that is orthogonal to the optical axis CR of the light incident on the collimation lens 130R. Similarly, the collimation-lens drive unit 150G has a function of supporting the collimation lens 130G and translating the collimation lens 130G along a movement plane P (a plane parallel to the YZ plane) that is orthogonal to the optical axis CG of the light incident on the collimation lens 130G.

Although illustration of a specific structure is omitted, the illumination device 100RGB further comprises a device housing 160. The device housing 160 is a housing that accommodates the three light sources 110R, 110G and 110B, the three magnifying lenses 120R, 120G and 120B, the three collimation lenses 130R, 130G and 130B, the one diffraction optical element 140RGB, and the three collimation-lens drive units 150R, 150G and 150B. In the example shown here, the device housing 160 is installed at a front part of an automobile. The device housing 160 also serves a function of fixedly supporting the three light sources 110R, 1106 and 110B, the three magnifying lenses 120R, 120G and 120B, the one diffraction optical element 140RGB and the three collimation-lens drive units 150R, 150G and 150B.

Similarly to FIG. 1, in FIG. 4, in order to clearly show the fixedly supporting function, the discrete parts of the device housing 160 are shown by using ground symbols of an electric circuit. Note that the reference numeral "160" is omitted for some of the ground symbols, in order to avoid complexity. The constituent elements other than the three collimation lenses 130R, 130G and 130B are fixedly supported by the device housing 160. On the other hand, the three collimation lenses 130R, 130G and 130B are respectively supported by the collimation-lens drive units 150R, 150G and 150B so as to be movable with respect to the device housing 160 (translatable along the movement planes P parallel to the YZ plane).

As described above, the illumination device 100RGB according to the modification example has a function of projecting the lighting pattern E as a colored hologram reconstructed image. Thus, by translating the respective collimation lenses 130R, 130G and 130B by means of the collimation-lens drive units 150R, 150G and 150B in the same direction by the same movement quantity, a projection position of the colored lighting pattern E can be displaced in a desired direction.

It is not necessary that the respective collimation lenses 130R, 130G and 130B are moved all together in the same direction by the same movement quantity. They can be moved in different directions by different movement quantities. When the three collimation lenses are moved together, the colored lighting pattern E can be displaced while its shape is maintained, as described above. On the other hand, when the three collimation lenses are separately moved (moved in different directions), a red lighting pattern ER, a green lighting pattern EG and a blue lighting pattern EB (they are all V-shaped graphic pattern) are displaced in different directions, whereby the colored lighting pattern E is decomposed into different colored lighting patterns, and the different colored lighting patterns are separately displayed. However, when such different lighting patterns are desired to be separately displayed, the three collimation lenses may be moved separately.

Thus, it is not necessary that the three collimation lenses are moved all together, one or more of the collimation lens(es) may be not driven but fixed on the device housing 160. For example, in the example shown in FIG. 4, as described above, illustration of the collimation-lens drive units 150R and 150G is omitted, but the three collimation-lens drive units 150R, 150G and 150B are actually provided. However, when this modification example is carried out, it is not necessary that the three collimation-lens drive units 150R, 150G and 150B are provided, but at least one collimation-lens drive unit may be provided.

For example, when only the collimation-lens drive unit 150B shown in FIG. 4 is provided, and the two not-shown collimation-lens drive units 150R and 150G are not provided, the collimation lenses 130R and 130G are fixed on the device housing 160, and only the collimation lens 130B can be moved. In this case, in the standard state, the colored lighting pattern E is displayed at the position as shown. When the collimation lens 130B is moved, the lighting pattern E is displayed at the same position by red and green mixed color components, and only a blue lighting pattern E is displaced.

In addition, in the modification example shown in FIG. 4, the three light sources 110R, 110G and 110B are light sources that generate lights of different wavelengths. However, when colored display is not necessary, it is not necessary that the three light sources are light sources that generate lights of different wavelengths. For example, when light sources that generate laser beams of the same wavelength are used as the three light sources 110R, 110G and 110B, the lighting pattern E is a monochromatic pattern, but is displayed as a brighter pattern as compared with a case in which a single light source is used. In this case, when the respective collimation lenses 130R, 130G and 130B are moved all together, the bright pattern can be displaced as it is. On the other hand, when the respective collimation lenses 130R, 130G and 130B are separately moved, the bright pattern is decomposed into three dark patterns.

As described above, when lights of the same wavelength are used, only one laser light source 110 may be used. In this case, a laser beam generated by the one laser light source 110 is split into three beams by using an optical element such as a beam splitter, and the three beams are supplied to the respective magnifying lenses 120R, 120G and 120B, and the respective collimation lenses 130R, 130G and 130B.

In addition, although FIG. 4 shows the example in which the lights generated by the three light sources 110R, 110G and 110B are supplied to the three collimation lenses 130R, 130G and 130B, the number of the light sources and the number of the collimation lenses are not necessarily limited to three, but the number may be a given number n.

In the modification example described here, a plurality of light sources the number of which is n are provided, and a plurality of collimation lenses the number of which is n are provided correspondingly to the respective light sources; wherein each collimation lens shapes a light from the corresponding light source into a parallel illumination light and applies the parallel illumination light to a predetermined corresponding irradiation area of the diffraction optical element; wherein each corresponding irradiation area diffracts the applied parallel illumination light so as to project a lighting pattern on a surface to be illuminated U; and wherein the collimation-lens drive unit may translate at least one of the n collimation lenses.

(2) Modification Example: Omission of Magnifying Lens

In the illumination device 100 shown in FIG. 1, the magnifying lens 120 is disposed between the light source 110 and the collimation lens 130, a light beam L1 generated by the light source 110 is broadened by the magnifying lens 120 so as to generate a divergent light L2, and the divergent light L2 is given to the collimation lens 130. However, when the light source 110 has a function of generating a light having a sectional area sufficient for displaying the lighting pattern E, the magnifying lens 120 can be omitted because such a light is not needed to be broadened.

Namely, when an emergent light emergent from the light source 110 has a sectional area sufficient for displaying the lighting pattern E, the emergent light may be directly supplied to the collimation lens 130, and the collimation lens 130 shapes the emergent light so as to generate a parallel illumination light L3. The structure in which the magnifying lens is omitted can be also applied to the illumination device 100RGB shown in FIG. 4.

(3) Modification Example: Direction of Motion of Collimation Lens

In the aforementioned examples and the modification examples, the collimation-lens drive unit 150 translates the collimation lens 130 along the movement plane P that is orthogonal to the optical axis C of a light incident on the collimation lens 130. To be more specific, since the optical axis C of the light incident on the collimation lens 130 is an axis parallel to the X axis, the collimation lens 130 is translated along the movement plate P parallel to the YZ plane.

However, when the present invention is carried out, the direction of motion of the collimation lens 130 is not limited to a direction along the movement plane P that is orthogonal to the optical axis C of a light incident on the collimation lens 130, and the collimation lens 130 may be moved in a given direction. However, when the collimation lens 130 is moved in a direction that is "parallel" to the optical axis C of a light incident on the collimation lens 130, the collimation lens 130 merely serves a function as a zoom lens, and cannot achieve the object of the present invention, i.e., the object of displacing the lighting pattern E on the surface to be illuminated U.

Thus, when the present invention is carried out, the collimation-lens drive unit 150 may translate the collimation lens 130 in a given direction of motion that is "not parallel" to the optical axis C of a light incident on the collimation lens 130. Note that, as described in § 1.2, when the collimation lens 130 can be moved in the vertical direction d1 and the horizontal direction d2, the lighting pattern E can be displaced in a given direction on the surface to be illuminated U. Thus, it is actually sufficient to employ the structure in which the collimation lens 130 is translated along the movement plane P that is orthogonal to the optical axis C of a light incident on the collimation lens 130.

When the above structure is employed, the configuration of the collimation-lens drive unit 150 can be simplified, and the illumination device can be reduced in size as a whole. Thus, it is actually preferable to employ the structure in which the collimation lens 130 is translated along the movement plane P that is orthogonal to the optical axis C.

(4) Modification Example: Utilization

In the aforementioned embodiment, the example in which the illumination device according to the present invention is installed on a front grill of an automobile is shown. However, it goes without saying that the utilization of the illumination device according to the present invention is not limited to the example in which the illumination device is installed on a front grill of an automobile. For example, the illumination device can be installed on a lighting unit of a general vehicle including an automobile. Alternatively, the illumination device can be located on a road surface and can be used in a stationary state.

(5) Other Modification Examples

Some modification examples related to the first embodiment of the present invention has been described, but various modification examples are possible in addition thereto. The basic technical idea of the first embodiment of the present invention is an illumination device comprising a light source, a collimation lens that collimates a light from the light source, and a diffraction optical element that diffracts a light from the collimation lens, wherein the collimation lens is supported so as to be operable in a direction that is not parallel to an optical axis of a light incident on the collimation lens. Various modification examples included in the scope of such a technical idea can be carried out. Practically, the collimation lens is preferably supported so as to be operable in a plane that is orthogonal to an optical axis of a light incident on the collimation lens.

In addition, as shown in FIG. 4 as the modification example, the illumination device according to the first embodiment can have a plurality of collimation lenses. In this case, at least one of the collimation lenses may be supported so as to be operable in a direction that is not parallel to an optical axis of a light incident on the collimation lens. However, it is practically preferable that the collimation lens supported so as to be operable is supported so as to be operable in a plane that is orthogonal to an optical axis of a light incident on the collimation lens.

Further, in the illumination device 100 shown in FIG. 1, the one magnifying lens 120 and the one collimation lens 130 are prepared for the one light source 110. On the other hand, in the modification example in which a plurality of light sources are used, at least one of the magnifying lens 120 and the collimation lens 130 may be shared by the plurality of light sources.

§ 2. Second Embodiment

Next, a second embodiment of the present invention is described with reference to FIGS. 5 and 6. A feature of the first embodiment described in § 1 is that a collimation lens is driven. On the other hand, a feature of the second embodiment described herein is that a light source, instead of a collimation lens, is driven. In other words, in the first embodiment, an incident angle of a parallel illumination light with respect to a diffraction optical element is changed by moving the collimation lens. On the other hand, in the second embodiment described herein, a light source is moved so that a relative position of the light source and a collimation lens is changed, so that an incident angle of a parallel illumination light with respect to a diffraction optical element is changed.

<2.1 Basic Structure of Second Embodiment>

Figure 5:
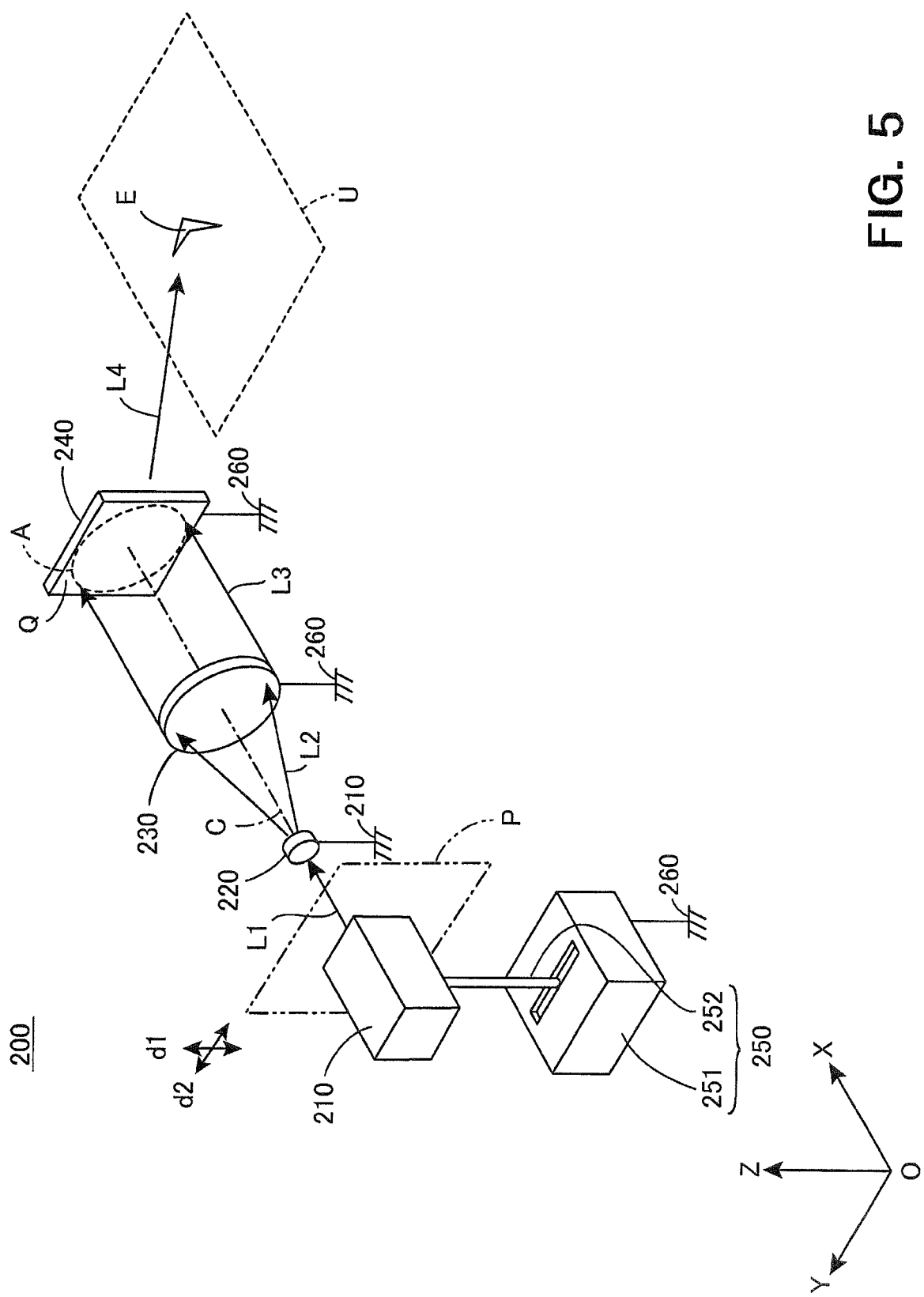
FIG. 5 is a perspective view showing an overall structure of an illumination device 200 according to a second embodiment of the present invention.

FIG. 5 is a perspective view showing an overall structure of an illumination device 200 according to the second embodiment of the present invention. Similarly to the illumination device 100 according to the first embodiment, the illumination device 200 is an illumination device having a function of projecting a predetermined lighting pattern E on a predetermined surface to be illuminated U. The surface to be illuminated U is a plane that forms an illuminated area illuminated by the illumination device 200. FIG. 5 shows that a lighting pattern E formed of a V-shaped graphic pattern is projected on the surface to be illuminated U.

Most of constituent elements of the illumination device 200 shown in FIG. 5 are the same as the constituent elements of the illumination device 100 shown in FIG. 1. Thus, detailed description of discrete constituent elements is omitted, and a difference from the illumination device 100 shown in FIG. 1 is described. Described also herein is an example in which the illumination device 200 is installed on an automobile, and a forward road surface is illuminated such that a lighting pattern E of a direction indicating sign showing its traveling direction is formed.

As illustrated, the illumination device 200 comprises a light source 210, a magnifying lens 220 that broadens a light beam L1 from the light source 210 so as to generate a divergent light L2, a collimation lens 230 that shapes a light (the divergent light L2 generated by the magnifying lens 220) from the light source 210 so as to generate a parallel illumination light L3, and a diffraction optical element 240 that diffracts the parallel illumination light L3 so as to project a lighting pattern E on a surface to be illuminated U (in this example, on a forward road surface). The light source 210, the magnifying lens 220, the collimation lens 230 and the diffraction optical element 240 are totally the same constituent elements as the light source 110, the magnifying lens 120, the collimation lens 130 and the diffraction optical element 140 in the illumination device 100 shown in FIG. 1.

A difference between the illumination device 100 shown in FIG. 1 and the illumination device 200 shown in FIG. 5 is that, in the former, the collimation lens 130 is driven by the collimation-lens drive unit 150, while in the latter, the light source 210 is driven by a light-source drive unit 250. The light-source drive unit 250 is a constituent element that serves a function of supporting the light source 210 and driving the same, and has a function of translating the light source 210 along a movement plane P that is orthogonal to an optical axis C of a light L1 generated by the light source 210 (in the illustrated standard state, the optical axis C of the light L1 is the same as an optical axis C of the divergent light L2 generated by the magnifying lens 220).

Although illustration of a specific structure is omitted, the illumination device 200 further has a device housing 260. The device housing is a housing that accommodates the light source 210, the magnifying lens 220, the collimation lens 230, the diffraction optical element 240 and the light-source drive unit 250. In the illustrated example, the device housing 260 is installed on a front part of an automobile. The device housing 260 also has a function of fixedly supporting the collimation lens 230, the diffraction optical element 240 and the light-source drive unit 250.

Also in FIG. 5, in order to clearly show the fixedly supporting function, discrete parts of the device housing 260 are shown by using ground symbols of an electric circuit. The light source 210 is supported by the light-source drive unit 250 so as to be movable with respect to the device housing 260. In addition, in this example, the magnifying lens 220 is fixed on the light source 210 instead of the device housing 260. Thus, when the light source 210 is moved by the light-source drive unit 250, the magnifying lens 220 is moved along with the light source 210. A driving method of the light source 210 and the magnifying lens 220 by the light-source drive unit 250 is described detail in the following § 2.2.

Also in FIG. 5, for the convenience of describing a geometric positional relationship among the respective constituent elements that constitute the illumination device 200, an XYZ three-dimensional orthogonal coordinate system having an X axis, a Y axis and a Z axis that are orthogonal to one another is defined. In the illustrated example, the illumination device 200 is installed on the automobile such that its traveling direction corresponds to a positive X direction, and the surface to be illuminated U (forward road surface) is defined on a plane parallel to an XY plane. In order to illuminate the surface to be illuminated U, the light source 210 has a function of emitting an illumination light beam L1 in the positive X direction. The collimation lens 230 and the diffraction optical element 240 are disposed on planes parallel to a YZ plane.

Also in this example, a laser light source is used as the light source 210. A laser beam L1 generated by the light source 210 is broadened by the magnifying lens 220 so as to generate divergent light L2. In the example shown herein, the laser beam L1 is a luminous flux having a circular section. The divergent light L2 of a conically spreading luminous flux is emergent from the magnifying lens 220. In FIG. 5, an optical axis C of the divergent light L2 (an optical axis of the light L2 incident on the collimation lens 230) is drawn with one-dot chain lines. The optical axis C is an axis parallel to the X axis.

The collimation lens 230 shapes the conically spreading divergent light L2 so as to generate a parallel illumination light L3, and applies the parallel illumination light L3 to an incident plane Q of the diffraction optical element 240. In the illustrated example, the respective constituent elements are disposed such that the optical axis of the laser beam L1 passes a center point of the collimation lens 220, that the optical axis C of the divergent light L2 (a center axis of the conically spreading divergent luminous flux) passes a center point of the collimation lens 230, and that an optical axis of the parallel illumination light L3 (a center axis of the parallel luminous flux) passes a center point of the diffraction optical element 240.

Thus, in the illustrated example, the optical axis of the laser beam L1, the optical axis C of the divergent light L2 and the optical axis of the parallel illumination light L3 coincide with one another. These axes are axes parallel to the X axis. Also in the second embodiment, this state is referred to as "standard state". In the standard state, the parallel illumination light L3 forms a parallel luminous flux parallel to the X axis, and its section (a section orthogonal to the optical axis) is circular. The diffraction optical element 240 is disposed such that its incident plane Q is parallel to the YZ plane. Thus, in the standard state, the parallel illumination light L3 is incident perpendicularly on the incident plane Q of the diffraction optical element 240. As a result, as indicated by broken lines, a circular irradiation area A is formed on the incident plane Q.

As described below, when the light source 210 is driven by the light-source drive unit 250 to deviate from the standard state, an incident angle of the parallel illumination light L3 with respect to the incident plane Q is changed. In this case, the irradiation area A on the diffraction optical element 240 has an elliptic shape.

On the other hand, the diffraction optical element 240 has a function of diffracting the parallel illumination light L3, which has been shaped by the collimation lens 230 and is applied to the incident plane Q, so as to generate a diffracted light L4, and projecting the lighting pattern E on the surface to be illuminated U by means of the obtained diffracted light L4. To be specific, the diffraction optical element 240 is formed of a hologram recording medium which is disposed such that its incident plane Q is parallel to the YZ plane. The hologram recording medium records interference fringes for generating a reconstructed image serving as the lighting pattern E on the surface to be illuminated U parallel to the XY plane. Since such a diffraction optical element 240 is a constituent element similar to the diffraction optical element 140 shown in FIG. 1, detailed description thereof is omitted here.

When the illumination device 200 shown in FIG. 5 is in the standard state, the light source 210 generates a light beam L1 having an optical axis parallel to the X axis; the magnifying lens 220 generates a divergent light L2 that diverges about the optical axis of the light beam L1; and the collimation lens 230 shapes the divergent light L2 so as to generate a parallel illumination light L3, and applies the parallel illumination light L3 to the diffraction optical element 240 having the incident plane Q parallel to the YZ plane. Moreover, the light source 210 can be translated by the light-source drive unit 250 along the movement plane P (a plane parallel to the YZ plane) that is orthogonal to the optical axis C of the light L1 generated by the light source 210. Due to the translation, the illumination device 200 is deviated from the standard state, so that an incident direction of the parallel illumination light L3 with respect to the incident plane Q is changed. Thus, as described blew, the lighting pattern E on the surface to be illuminated U can be displaced.

<2.2 Basic Operation of Second Embodiment>

The important feature of the illumination device 200 according to the second embodiment is that the light source 210 is driven by the light-source drive unit 250. As described above, the collimation lens 230, the diffraction optical element 240 and the light-source drive unit 250 are fixedly supported by the device housing 260, while the light source 210 and the magnifying lens 220 are not directly fixed on the device housing 260 but are supported to be movable by the light-source drive unit 250.

Thus, a relative position of the light source 210 and the magnifying lens 220 with respect to the device housing 260 is changed by the light-source drive unit 250. This means that a relative position of the light source 210 and the magnifying lens 220 with respect to the collimation lens 230 and the diffraction optical element 240.

To be specific, the light-source drive unit 250 has a function of translating the light source 210 along the movement plane P that is orthogonal to the optical axis C of the light L1 generated by the light source 210. In the illustrated example, since the light source 210 generates the laser beam L1 in a direction parallel to the X axis, the movement plane P orthogonal to the optical axis C of the laser beam L1 is a plane that is parallel to the YZ plane.

Also herein, when a direction (Z-axis direction) orthogonal to the surface to be illuminated U is referred to as a vertical direction d1, and a direction (a direction along the XY plane) parallel to the surface to be illuminated U is referred to as a horizontal direction d2, as shown by the arrows d1 and d2 in FIG. 5, the light-source drive unit 250 has a vertically driving function of moving the light source 210 along the movement plane P in the vertical direction d1, and a horizontally driving function of moving the light source 210 along the movement plane P in the horizontal direction d2. By combining the vertically driving function and the horizontally driving function, the light source 210 can be translated along the movement plane P, not only in the vertical direction d1 and the horizontal direction d2 but also in a given direction.

As illustrated, the light-source drive unit 250 has a drive mechanism 251 and a support arm 252, and has a function of supporting the light source 210 and translating the light source 210 along the movement plane P (a plane parallel to the YZ plane). As such a drive mechanism 251, a general mechanism for moving the support arm 252 with the use of a motor and gears can be employed, and detailed description thereof is omitted here.

As described above, since the magnifying lens 220 is fixed on the light source 210, when the light-source drive unit 250 translates the light source 210 along the movement plane P, the magnifying lens 220 is translated along therewith. Thus, a relative position of the light beam L1 and the divergent light L2 with respect to the device housing 260 is changed, so that their relative position with respect to the collimation lens 230 and the diffraction optical element 240, which are fixed on the device housing 260, is also changed. Thus, an incident position of the divergent light L2 with respect to the collimation lens 230 is changed.

In the standard state shown in FIG. 5, a relative positional relationship among the respective constituent elements is adjusted such that the optical axis C of the divergent light L2 passes the center point of the collimation lens 230, and the divergent light L2 is disposed at a position that is rotational symmetry with respect to the center axis of the collimation lens 230. As a result, the optical axis of the parallel illumination light L3 emergent from the collimation lens 230 coincides with the optical axis C of the divergent light L2. The parallel illumination light L3 is incident on the incident plane Q of the diffraction optical element 240 in a direction perpendicular thereto, and forms the circular irradiation area A.

However, when the light source 210 and the magnifying lens 220 are moved by the light-source drive unit 250, the incident position of the divergent light L2 with respect to the collimation lens 230 is changed. Thus, the illumination device 200 is deviated from the aforementioned standard state. Namely, in the standard state shown in FIG. 5, the parallel illumination light L3 emergent from the collimation lens 230 becomes a parallel luminous flux that is parallel to the X axis, and is incident on the incident plane Q of the diffraction optical element 240 in a direction perpendicular thereto. On the other hand, when the incident position of the divergent light L2 with respect to the collimation lens 230 is changed, the parallel illumination light L3 emergent from the collimation lens 230 becomes a parallel luminous flux that is inclined with respect to the X axis. Thus, an incident angle of the parallel illumination light L3 with respect to the incident plane Q is changed. As a result, an emergent direction of the diffracted light L4 emergent from the diffraction optical element 240 is changed, so that a projection position of the lighting pattern E on the surface to be illuminated U is also changed.

In other words, when the light source 210 and the magnifying lens 220 are moved, an incident position of the divergent light L2 with respect to the collimation lens 230 is changed. In accordance with a displacement direction and a displacement quantity of the incident position, an emergent angle of the parallel illumination light L3 emergent from the collimation lens 230 is changed. Thus, an incident angle of the parallel illumination light L3 with resect to the diffraction optical element 240 is changed, an emergent direction of the diffracted light L4 emergent from the diffraction optical element 240 is changed, and a projection position of the lighting pattern E on the surface to be illuminated U is changed.

In conclusion, also in the second embodiment, similarly to the aforementioned first embodiment, by changing a relative positional relationship between the light source 210 and the collimation lens 230, an incident angle of the parallel illumination light L3 with resect to the diffraction optical element 240 is changed. Thus, the change in optical phenomenon generated in the diffraction optical element 240 which is caused by the movement of the light source 210 and the magnifying lens 220 is basically similar to the change described in FIG. 2.

As described above, as shown by the arrows d1 and d2 in FIG. 5, the light-source drive unit 250 of the illumination device 200 shown in FIG. 5 has a vertically driving function of moving the light source 210 along the movement plane P in the vertical direction d1, and a horizontally driving function of moving the light source 210 along the movement plane P in the horizontal direction d2. By combining the vertically driving function and the horizontally driving function, the light source 210 can be translated along the movement plane P, not only in the vertical direction d1 and the horizontal direction d2 but also in a given direction.

When the light source 210 and the magnifying lens 220 are moved in the vertical direction d1, the lighting pattern E on the surface to be illuminated U can be displaced in the X-axis direction. On the other hand, when the light source 210 and the magnifying lens 220 are moved in the horizontal direction d2, the lighting pattern E on the surface to be illuminated U can be displaced in the Y-axis direction. Thus, similarly to the example shown in FIG. 3, by variously displacing the lighting pattern E0 in the standard state, lighting patterns E1 to E3 can be obtained, for example.

Also in the second embodiment, when the lighting pattern E is displaced from the position in the standard state, a profile, in particular, an outline of a luminous flux of the diffracted light L4 from the diffraction optical element 240 is slightly changed, so that the lighting pattern E (the V-shaped graphic pattern) displayed on the surface to be illuminated U is slightly deformed in a precise sense. However, as long as the displacement quantity of the light source 230 is not extremely large, the deformation of the lighting pattern E is negligible and no serious trouble practically occurs.

In addition, as described in § 1.2, in connection with the translation of the light source 210, the protrusion phenomenon in which a part of the irradiation area A moves outward the incident plane Q, and there is a possibility that an irradiance of the lighting pattern E decreases. However, as described above, no serious trouble practically occurs. In order to prevent a decrease in irradiance, the size of the diffraction optical element 240 is designed slightly larger, such that the irradiation area A formed on the incident plane Q of the diffraction optical element 240 does not protrude from the hologram forming surface on the incident plane Q, even when an incident angle of the parallel illumination light L3 is changed (in this case, another problem occurs: the size of the illumination device 200 becomes larger as a whole).

Such a protrusion similarly occurs in the collimation lens 230. Namely, in FIG. 5, when the outline of the irradiation area of the conically spreading divergent light L2 with respect to the collimation lens 230 is designed to reach a point close to the outline of the collimation lens 230, there is a possibility that a part of the divergent light L2 protrudes outside from the collimation lens 230 by the movement of the divergent light L2.

Even when such a protrusion occurs, no serious trouble occurs, although a quantity of light for illumination decreases and an irradiance of the lighting pattern E lowers (a protruding light is preferably cut by an aperture). When a size of the collimation lens 230 is designed to be larger, such a protrusion can be of course prevented. However, another problem occurs: the size of the illumination device 200 becomes larger as a whole.

<2.3 Modification Example of Second Embodiment>

Next, some modification examples of the illumination device 200 according to the second embodiment shown in FIG. 5 are described.

(1) Modification Example: Use of a Plurality of Light Sources and Collimation Lenses FIG. 6 is a perspective view showing an overall structure of an illumination device 200RGB according to a modification example of the second embodiment shown in FIG. 5. Similarly to FIG. 5, an XYZ three-dimensional orthogonal coordinate system is defined. A feature of the illumination device 200RGB is that it comprises three light sources 210R, 210G and 210B, and three magnifying lenses 220R, 220G, 220B and three collimation lenses 230R, 230G and 230B, which are disposed correspondingly to the three light sources. The respective three constituent elements are arranged side by side in the horizontal direction (Y-axis direction). In order to receive parallel illumination lights L3R, L3G and L3B from the respective collimation lenses 230R, 230G and 230B, the diffraction optical element 240RGB has a horizontally elongated shape.

The three light sources 210R, 210G and 210B are laser light sources that are basically similar to the light source 210 shown in FIG. 5, but have functions of generating lights of different wavelengths. To be specific, the light source 210R is a red laser light source that generates a red laser beam L1R, the light source 210G is a green laser light source that generates a green laser beam L1G, and the light source 210B is a blue laser light source that generates blue laser beam L1B. They emit the respective laser beams L1R, L1G and L1B in a direction parallel to the X axis. These light sources may either be provided as independent components, or be a light emission module in which the light sources are arranged on a common substrate.

The three magnifying lens 220R, 220G and 220B and the three collimation lens 230R, 230G and 230B are totally the same constituent elements as the magnifying lens 220 and the collimation lens 230 shown in FIG. 5. Thus, the red laser beam L1R generated by the red light source 210R is broadened by the magnifying lens 220R into a red divergent light L2R. The red divergent light L2R is further shaped by the collimation lens 230R into a red parallel illumination light L3R. The red parallel illumination light L3R is applied to a corresponding incident area AR (in the illustrated example, a circular area shown by broken lines) on an incident plane Q of the diffraction optical element 240RGB.

Similarly, a green laser beam L1G generated by the green light source 210G is broadened by the magnifying lens 220G into a green divergent light L2G. The green divergent light L2G is further shaped by the collimation lens 230G into a green parallel illumination light L3G. The green parallel illumination light L3G is applied to a corresponding incident area AG (in the illustrated example, a circular area shown by broken lines) on the incident plane Q of the diffraction optical element 240RGB. In addition, a blue laser beam L1B generated by the blue light source 210B is broadened by the magnifying lens 220B into a blue divergent light L2B. The blue divergent light L2B is further shaped by the collimation lens 230B into a blue parallel illumination light L3B. The blue parallel illumination light L3B is applied to a corresponding incident area AB (in the illustrated example, a circular area shown by broken lines) on the incident plane Q of the diffraction optical element 240RGB.

Similarly to the illumination device 200 shown in FIG. 5, in the standard state, optical axes of the respective laser beams L1R, L1G, L1B, optical axes CR, CG, CB of the respective divergent lights L2R, L2G, L2B, and optical axes of the respective parallel illumination lights L3R, L3G and L3B are parallel to the X axis. However, when the light sources 210R, 210G, 210B are translated, the optical axes of the parallel illumination lights L3R, L3G, L3B are inclined to the X axis, and a shape and a formation position of the corresponding incident area AR, AG, AB are changed.

Similarly to the diffraction optical element 240 shown in FIG. 5, the diffraction optical element 240RGB has the incident plane Q parallel to the YZ plane, and has a function of diffracting the respective parallel illumination lights L3R, L3G, L3B into a diffracted light L4RGB and projecting a lighting pattern E on a surface to be illuminated U by the obtained diffracted light L4RGB. In the example shown here, hologram interference fringe pattern, which records interference fringes corresponding to a center wavelength of the red laser beam L1R, is recorded in and near the red corresponding irradiation area AR in the incident plane Q of the diffraction optical element 240RGB. A hologram interference fringe pattern, which records interference fringes corresponding to a center wavelength of the green laser beam L1G, is recorded in and near the green corresponding irradiation area AG in the incident plane Q of the diffraction optical element 240RGB. A hologram interference fringe pattern, which records interference fringes corresponding to a center wavelength of the blue laser beam L1B, is recorded in and near the blue corresponding irradiation area AB in the incident plane Q of the diffraction optical element 240RGB.

These respective hologram interference fringes are interference fringes for generating a reconstructed image as a predetermined lighting pattern E (V-shaped graphic pattern) on the surface to be illuminated U parallel to the XY plane. Thus, a red diffracted light from the red corresponding irradiation area AR, a green diffracted light from the green corresponding irradiation area AG and a blue diffracted light from the blue corresponding irradiation area AB each form a reconstructed image as the lighting pattern E at the same position on the surface to be illuminated U. As a result, the lighting pattern E is a colored V-shaped graphic pattern formed by superimposing diffracted lights of three colors.

By adjusting the radiant fluxes [unit: W] of the three laser light sources 210R, 210G and 210B, a color of the lighting pattern E can be adjusted. In addition, in order to increase a light intensity, a plurality of the laser light sources may be provided for each of the emission wavelength ranges. In the illustrated example, the single diffraction optical element 240RGB is used. However, instead thereof, three diffraction optical elements 240R, 240G and 240B may be used, and the respective parallel incident lights L3R, L3G and L3B may be applied to the corresponding diffraction optical elements 240R, 240G and 240B.

The light-source drive unit 250B is a constituent element similar to the light-source drive unit 250 shown in FIG. 5. Namely, as illustrated, the light-source drive unit 250B has a drive mechanism 251B and a support arm 252B, and has a function of supporting the light source 210B and translating the light source 210B along a movement plane P (a plane parallel to the YZ plane) that is orthogonal to the optical axis of a light generated by it.

Figure 6:
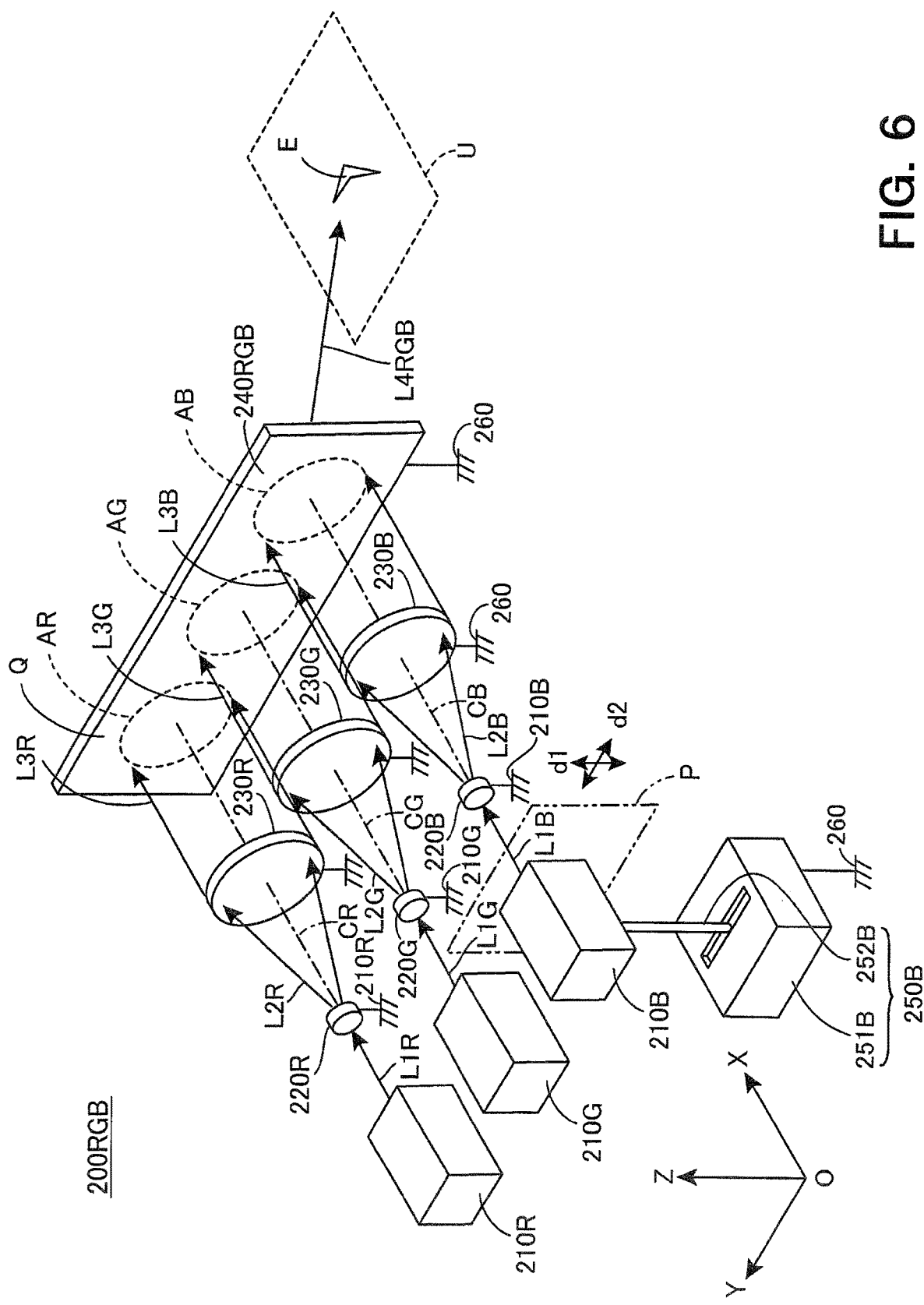
FIG. 6 is a perspective view showing an overall structure of an illumination device 200RGB according to a modification example of the second embodiment shown in FIG. 5.

Although not shown in FIG. 6 in order to avoid complexity, light-source drive units 250R and 250G, which have the same structure as that of the light-source drive unit 250B, are also provided. The light-source drive unit 250R has a function of supporting the light source 210R and translating the light source 210R along a movement plane P (a plane parallel to the YZ plane) that is orthogonal an optical axis of a light generated by it. Similarly, the light-source drive unit 250G has a function of supporting the light source 210G and translating the light source 210G along a movement plane P (a plane parallel to the YZ plane) that is orthogonal an optical axis of a light generated by it.

Although illustration of a specific structure is omitted, the illumination device 200RGB further comprises a device housing 260. The device housing 260 is a housing that accommodates the three light sources 210R, 210G and 210B, the three magnifying lenses 220R, 220G and 220B, the three collimation lenses 230R, 230G and 230B, the one diffraction optical element 240RGB, and the three light-source drive units 250R, 250G and 250B. In the example shown here, the device housing 260 is installed at a front part of an automobile. The device housing 260 also serves a function of fixedly supporting the three collimation lenses 230R, 230G and 230B, the one diffraction optical element 240RGB and the three light-source drive units 250R, 250G and 250B.

Similarly to FIG. 5, in FIG. 6, in order to clearly show the fixedly supporting function, the discrete parts of the device housing 260 are shown by using ground symbols of an electric circuit. Note that the reference numeral "260" is omitted for some ground symbols, in order to avoid complexity. The three magnifying lenses 220R, 220G and 220B are fixed to the three light sources 210R, 210G and 210B. The three light sources 210R, 210G and 210B are respectively supported by the light-source drive units 250R, 250G and 250B so as to be movable with respect to the device housing 260 (translatable along the movement plane P parallel to the YZ plane). Thus, the light source 210R and the magnifying lens 220R are integrally moved, the light source 210G and the magnifying lens 220G are integrally moved, and the light source 210B and the magnifying lens 220B are integrally moved.

As described above, the illumination device 200RGB according to the modification example has a function of projecting the lighting pattern E as a colored hologram reconstructed image. Thus, by translating the respective light sources 210R, 210G and 210B by means of the light-source drive units 250R, 250G and 250B in the same direction by the same distance, a projection position of the colored lighting pattern E can be displaced in a desired direction.

It is not necessary that the respective light sources 210R, 210G and 210B are moved all together in the same direction by the same distance. They can be moved in different directions by different distances. When the three light sources are moved all together, the colored lighting pattern E can be displaced maintaining its shape, as described above. On the other hand, when the three light sources are separately moved (moved in different directions), a red lighting pattern ER, a green lighting pattern EG and a blue lighting pattern EB (they are all V-shaped graphic pattern) are displaced in different directions, whereby the colored lighting pattern E is decomposed into different colored lighting patterns, and the different colored lighting patterns are separately displayed.

Thus, since it is not necessary that the three light sources are moved all together, one or more of the light source(s) may not be driven but fixed on the device housing 260. For example, in the example shown in FIG. 6, as described above, illustration of the light-source drive units 250R and 250G is omitted, but the three light-source drive units 250R, 250G and 250B are actually provided. However, when this modification example is carried out, it is not necessary that the three light-source drive units 250R, 250G and 250B are provided, but at least one light-source drive unit is provided.

For example, when only the light-source drive unit 250B shown in FIG. 6 is provided, and the two not-shown light-source drive units 250R and 250G are not provided, the light sources 210R and 210G (and the magnifying lenses 220R and 220G) are fixed on the device housing 260, and only the light source 210B can be moved. In this case, in the standard state, the colored lighting pattern E is displayed at the position as shown. When the light source 210B is moved, the lighting pattern E is displayed by red and green mixed color components at the same position, and only a blue lighting pattern E is displaced.

In addition, in the modification example shown in FIG. 6, the three light sources 210R, 210G and 210B are light sources that generate lights of different wavelengths. However, when colored display is not necessary, it is not necessary that the three light sources are light sources that generate lights of different wavelengths. When lights of the same wavelength are used, a single layer light source 210 may be used, and a laser beam generated by the single laser light source 210 is split into three beams by using an optical element such as a beam splitter.

In addition, although FIG. 6 shows the example in which the lights generated by the three light sources 210R, 210G and 210B are supplied to the three magnifying lenses 210R, 210G and 210B and the three collimation lenses 230R, 230G and 230B, respectively, the number of the light sources, the number of the magnifying lenses and the number of the collimation lenses are not necessarily limited to three, but the number may be a given number n.

In the modification example described here, a plurality of light sources, the number of which is n, are provided, and a plurality of collimation lenses, the number of which is n, are provided correspondingly to the respective light sources. The light-source drive unit may translate at least one of the plurality of light sources, such that each collimation lens shapes a light from the corresponding light source into a parallel illumination light and applies the parallel illumination light to a predetermined corresponding irradiation area of the diffraction optical element, and that each corresponding irradiation area diffracts the applied parallel illumination light so as to project a lighting pattern on a surface to be illuminated U.

(2) Modification Example: Omission of Magnifying Lens

In the illumination device 200 shown in FIG. 5, the magnifying lens 220 is disposed between the light source 210 and the collimation lens 230, a light beam L1 generated by the light source 210 is broadened by the magnifying lens 220 so as to generate a divergent light L2, the divergent light L2 is given to the collimation lens 230, and the magnifying lens 220 is moved together with the light source 210. However, when the light source 210 has a function of generating a light having a sectional area sufficient for displaying the lighting pattern E, the magnifying lens 220 can be omitted because such a light is not needed to be broadened.

Namely, when an emergent light emergent from the light source 210 has a sectional area sufficient for displaying the lighting pattern E, the emergent light may be directly supplied to the collimation lens 230, and the collimation lens 230 shapes the emergent light to generate a parallel illumination light L3. The structure in which the magnifying lens is omitted can be also applied to the illumination device 200RGB shown in FIG. 6.

(3) Modification Example: Direction of Motion of Light Source

In the aforementioned examples and the modification examples, the light source 210 is translated by the light-source drive unit 250 along the movement plane P that is orthogonal to the optical axis of the light L1 generated by the light source 210. To be more specific, since the optical axis of the light beam L1 generated by the light source 210 is an axis parallel to the X axis, the light source 210 is translated along the movement plane P parallel to the YZ plane.

However, when the present invention is carried out, the direction of motion of the light source 210 is not limited to a direction along the movement plane P that is orthogonal to the optical axis of the light generated by the light source 210, and the light source 210 may be moved in a given direction. However, when the light source 210 is moved in a direction that is "parallel" to the optical axis of the light generated by the light source 210, it is impossible to achieve the object of the present invention, i.e., the object of displacing the lighting pattern E on the surface to be illuminated U.

Thus, when the present invention is carried out, the light-source drive unit 250 may translate the light source 210 in a given direction that is "not parallel" to the optical axis of the light generated by the light source 210. Note that, as described in § 2.2, when the light source 210 can be moved in the vertical direction d1 and the horizontal direction d2, the lighting pattern E can be displaced in a given direction on the surface to be illuminated U. Thus, it is actually sufficient to employ the structure in which the light source 210 is translated along the movement plane P that is orthogonal to the optical axis of the light generated by the light source 210.

When the above structure is employed, the configuration of the light-source drive unit 250 can be simplified, and the illumination device can be reduced in size as a whole. Thus, it is actually preferable to employ the structure in which the light source 210 is translated along the movement plane P that is orthogonal to the optical axis of the light generated by the light source 210.

(4) Modification Example: Utilization

In the aforementioned embodiment, the example in which the illumination device according to the present invention is installed on a front grill of an automobile is shown. However, it goes without saying that the utilization of the illumination device according to the present invention is not limited to the example in which the illumination device is installed on a front grill of an automobile. For example, the illumination device can be installed on a lighting unit of a general vehicle including an automobile. Alternatively, the illumination device can be located on a road surface and can be used in a stationary state.

(5) Modification Example: Driving Light Source or Magnifying Lens Only

In the illumination device 200 shown in FIG. 5, the magnifying lens 220 is fixed on the light source 210, so that the light source 210 and the magnifying lens 220 are integrally moved. However, the magnifying lens 220 may be fixed on the device housing 260, and only the light source 210 may be moved by the light-source drive unit 250.

When the light source 210 is moved, the light beam L1 is moved, although the magnifying lens 220 is not moved. Thus, the divergent light L2 is moved, so that an orientation of the parallel illumination light L3 emergent from the collimation lens 230 can be changed. This applies to the illumination device 200RGB shown in FIG. 6. However, the diameter of the magnifying lens 220 is generally smaller than the diameter of the collimation lens 230. Thus, when the distance moved by the light beam L1 is large to a certain degree, there is an impact caused by lens aberration. In addition, when the distance moved by the light beam L1 is large, the light beam L1 is deviated from the magnifying lens 220. Thus, it is practically preferable that the magnifying lens 220 is moved together with the light source 210, as described in the aforementioned examples.

As another modification example, the light source 210 may be fixed on the device housing 260, and only the magnifying lens 220 may be moved by the light-source drive unit 250. Since the light source 210 is not moved, the light beam L1 is not moved. However, since the magnifying lens 220 is moved, the divergent light L2 is moved, so that an orientation of the parallel illumination light L3 emergent from the collimation lens 230 can be changed. This applies to the illumination device 200RGB shown in FIG. 6. However, similarly to the above modification example in which only the light source is moved, when the distance moved by the magnifying lens 220 is large to a certain degree, there is an impact caused by lens aberration. In addition, when the distance moved by the magnifying lens 220 is large, the light beam L1 is deviated from the magnifying lens 220. Thus, it is practically preferable that the magnifying lens 220 is moved together with the light source 210, as described in the aforementioned examples.

(6) Other Modification Examples

Some modification examples related to the second embodiment of the present invention has been described, but various modification examples are possible in addition thereto. The basic technical idea of the second embodiment of the present invention is an illumination device comprising a light source, a collimation lens that collimates a light from the light source, and a diffraction optical element that diffracts a light from the collimation lens, wherein the light source is supported so as to be operable in a direction that is not parallel to an optical axis of a light emergent from the light source. Various modification examples included in the scope of such technical idea can be carried out. Practically, the light source is preferably supported so as to be operable in a plane that is orthogonal to an optical axis of a light emergent from the light source.

In addition, as shown in FIG. 6 as the modification example, the illumination device according to the second embodiment can have a plurality of light sources. In this case, at least one of the light sources may be supported so as to be movable in a direction that is not parallel to an optical axis of a light emergent from the light source. However, it is practically preferable that the light source supported so as to be movable is supported so as to be movable in a plane that is orthogonal to an optical axis of a light emergent from the light source.

Further, in the illumination device 200 shown in FIG. 5, one magnifying lens 220 and one collimation lens 230 are arranged for one light source 210. On the other hand, in the modification example in which a plurality of light sources are used, at least either of the magnifying lens 220 and the collimation lens 230 may be shared by the plurality of light sources.

The illumination device according to the present invention can be widely used in projecting a predetermined lighting pattern on a preset surface to be illuminated, such as a road surface, a ground surface, a floor surface, a surface below water, and a wall surface. In addition, since a projection position of the lighting pattern can be moved, the present invention is best suited for displaying a graphic, such as a direction indicating sign showing a traveling direction of a vehicle, on a desired position.

100: Illumination device according to first embodiment
100RGB: Illumination device according to modification example of first embodiment
110: Light source (laser light source)
110R: Red light source (red laser light source)
110G: Green light source (green laser light source)
110B: Blue light source (blue laser light source)
120: Magnifying lens
120R, 120G, 120B: Magnifying lens
130: Collimation lens
130R, 130G, 130B: Collimation lens
140: Diffraction optical element (hologram)
140RGB: Diffraction optical element (hologram)
150: Collimation-lens drive unit
150B: Collimation-lens drive unit
151: Drive mechanism
151B: Drive mechanism
152: Support arm
152B: Support arm
160: Device housing
200: Illumination device according to second embodiment
200RGB: Illumination device according to modification example of second embodiment
210: Light source (laser light source)
210R: Red light source (red laser light source)
210G: Green light source (green laser light source)
210B: Blue light source (blue laser light source)
220: Magnifying lens
220R, 220G, 220B: Magnifying lens
230: Collimation lens
230R, 230G, 230B: Collimation lens
240: Diffraction optical element (hologram)
240RGB: Diffraction optical element (hologram)
250: Light-source drive unit
250B: Light-source drive unit
251: Drive mechanism
251B: Drive mechanism
252: Support arm
252B: Support arm
260: Device housing
A: Irradiation area
AR, AG, AB: Corresponding irradiation area
C: Optical axis
CR, CG, CB: Optical axis
d1: Vertical direction
d2: Horizontal direction
E, E0 to E3: Lighting pattern (V-shaped graphic pattern)
L1: Light beam (laser beam)
L1R, L1G, L1B: Light beam (laser beam)
L2: Divergent light
L2R, L2G, L2B: Divergent light
L3: Parallel illumination light
L3R, L3G, L3B: Parallel illumination light
L4: Diffracted light
L4RGB: Diffracted light
L30: Line group showing optical axis of parallel illumination light L3
L31: Arrow group showing optical path on one outline position of luminous flux constituting parallel illumination light L3
L32: Arrow group showing optical path on the other outline position of luminous flux constituting parallel illumination light L3
O: Original point of XYZ three-dimensional orthogonal coordinate system
P: Movement plane
Q: Incident plane (light receiving plane)
U: surface to be illuminated
X: Coordinate axis of XYZ three-dimensional orthogonal coordinate system
Y: Coordinate axis of XYZ three-dimensional orthogonal coordinate system
Z: Coordinate axis of XYZ three-dimensional orthogonal coordinate system

What is claimed is:

1. An illumination device that projects a predetermined lighting pattern on a surface to be illuminated, the illumination device comprising:
a light source;
a collimation lens that shapes a light from the light source into a parallel illumination light;
a diffraction optical element that diffracts the parallel illumination light so as to project the lighting pattern on the surface to be illuminated; and
a collimation-lens drive unit that supports the collimation lens and drives the same;
wherein the diffraction optical element is formed of a hologram recording medium, and the hologram recording medium records an interference fringe for generating a reconstructed image serving as the lighting pattern on the surface to be illuminated;
wherein, an XYZ three-dimensional coordinate system is defined having an X axis, a Y axis and a Z axis that are orthogonal to one another, the light source generates a light beam having an optical axis parallel to the X axis, and the diffraction optical element has an incident plane parallel to a YZ plane; and wherein the collimation-lens drive unit translates the collimation lens in a predetermined direction that is not parallel to an optical axis of a light incident on the collimation lens.

2. The illumination device according to claim 1, wherein the collimation-lens drive unit translates the collimation lens along a movement plane that is orthogonal to the optical axis of the light incident on the collimation lens.

3. The illumination device according to claim 2, further comprising a magnifying lens disposed between the light source and the collimation lens, wherein the light source generates a light beam, the magnifying lens broadens the light beam so as to generate a divergent light, and the collimation lens shapes the divergent light so as to generate a parallel illumination light.

4. The illumination device according to claim 3, wherein the magnifying lens generates a divergent light that diverges about the optical axis;

wherein the collimation lens shapes the divergent light to generate a parallel illumination light; and wherein the collimation-lens drive unit drives the collimation lens such that the collimation lens is translated along a movement plane parallel to the YZ plane, so that an incident direction of the parallel illumination light with respect to the incident plane is changed by the driving operation.

5. The illumination device according to claim 1, wherein the diffraction optical element is formed of a hologram recording medium that is disposed such that the incident plane is parallel to the YZ plane, and the hologram recording medium records an interference fringe for generating a reconstructed image serving as the lighting pattern on the surface to be illuminated parallel to an XY plane.

6. The illumination device according to claim 3, further comprising a device housing that accommodates the light source, the magnifying lens, the collimation lens, the diffraction optical element and the collimation-lens drive unit, and fixedly supports the light source, the magnifying lens, the diffraction optical element and the collimation-lens drive unit.

7. The illumination device according to claim 1, wherein the illumination device comprises a plurality of light sources, the number of which is n, and a plurality of collimation lenses, the number of which is n, and wherein the collimation lenses are disposed correspondingly to the plurality of light sources;

wherein each collimation lens shapes a light from the corresponding light source into a parallel illumination light, and applies the parallel illumination light to a predetermined corresponding irradiation area of the diffraction optical element, and the corresponding irradiation area diffracts the applied parallel illumination light so as to project the lighting pattern on the surface to be illuminated; and wherein the collimation-lens drive unit translates at least one of the plurality of collimation lenses.

8. An illumination device that projects a predetermined lighting pattern on a surface to be illuminated, comprising:

a light source;

a collimation lens that shapes a light from the light source into a parallel illumination light;

a diffraction optical element that diffracts the parallel illumination light so as to project the lighting pattern on the surface to be illuminated; and a light-source drive unit that supports the light source and drives the same;

wherein the diffraction optical element is formed of a hologram recording medium, and the hologram recording medium records an interference fringe for generating a reconstructed image serving as the lighting pattern on the surface to be illuminated;

wherein, when an XYZ three-dimensional coordinate system is defined having an X axis, a Y axis and a Z axis that are orthogonal to one another, the light source generates a light beam having an optical axis parallel to the X axis, and the diffraction optical element has an incident plane parallel to a YZ plane; and wherein the light-source drive unit translates the light source in a predetermined direction that is not parallel to an optical axis of a light generated by the light source.

9. The illumination device according to claim 8, wherein the light-source drive unit translates the light source along a movement plane that is orthogonal to the optical axis of the light generated by the light source.

10. The illumination device according to claim 9, further comprising a magnifying lens disposed between the light source and the collimation lens;

wherein the light source generates a light beam, the magnifying lens broadens the light beam so as to generate a divergent light, and the collimation lens shapes the divergent light so as to generate a parallel illumination light; and wherein the magnifying lens is moved together with the light source.

11. The illumination device according to claim 10, wherein the magnifying lens generates a divergent light that diverges about the optical axis;

wherein the collimation lens shapes the divergent light so as to generate a parallel illumination light; and wherein the light-source drive unit drives the light source such that the light source is translated along a movement plane parallel to the YZ plane, so that an incident direction of the parallel illumination light with respect to the incident plane is changed by the driving operation.

12. The illumination device according to claim 8, wherein the diffraction optical element is formed of a hologram recording medium that is disposed such that the incident plane is parallel to the YZ plane, and the hologram recording medium records an interference fringe for generating a reconstructed image serving as the lighting pattern on the surface to be illuminated parallel to an XY plane.

13. The illumination device according to claim 10, further comprising a device housing that accommodates the light source, the magnifying lens, the collimation lens, the diffraction optical element and the light-source drive unit, and fixedly supports the collimation lens, the diffraction optical element and the light-source drive unit, wherein the magnifying lens is fixed on the light source and is moved together with the light source.

14. The illumination device according to claim 8, wherein the illumination device comprises a plurality of light sources the number of which is n, and a plurality of collimation lenses the number of which is n, the collimation lenses being disposed correspondingly to the plurality of light sources;

wherein each collimation lens shapes a light from the corresponding light source into a parallel illumination light, and applies the parallel illumination light to a predetermined corresponding irradiation area of the diffraction optical element, and the corresponding irradiation area diffracts the applied parallel illumination light so as to project the lighting pattern on the surface to be illuminated; and wherein the light-source drive unit translates at least one of the plurality of light sources.

* * * * *